US008988585B2

(12) United States Patent
Hamano

(10) Patent No.: US 8,988,585 B2
(45) Date of Patent: Mar. 24, 2015

(54) FOCUS ADJUSTMENT APPARATUS

(75) Inventor: Hideyuki Hamano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 293 days.

(21) Appl. No.: 13/230,146

(22) Filed: Sep. 12, 2011

(65) Prior Publication Data

US 2012/0062786 A1 Mar. 15, 2012

(30) Foreign Application Priority Data

Sep. 14, 2010 (JP) ................................. 2010-205293

(51) Int. Cl.
G03B 13/00 (2006.01)
G03B 13/18 (2006.01)
G02B 7/38 (2006.01)
H04N 5/232 (2006.01)

(52) U.S. Cl.
CPC *G03B 13/18* (2013.01); *G02B 7/38* (2013.01); *H04N 5/23212* (2013.01)
USPC .......................................... 348/345; 348/349

(58) Field of Classification Search
CPC .............. H04N 5/23212; H04N 5/225; H04N 5/23293; G02B 27/144; G02B 23/12
USPC ......................................................... 348/345
See application file for complete search history.

(56) References Cited

U.S. PATENT DOCUMENTS

| 4,739,411 | A * | 4/1988 | Bolton | 348/346 |
| 6,829,008 | B1 * | 12/2004 | Kondo et al. | 348/302 |
| 7,634,185 | B2 * | 12/2009 | Terayama et al. | 396/95 |
| 7,783,189 | B2 * | 8/2010 | Kubota | 396/213 |
| 2008/0258039 | A1 | 10/2008 | Kusaka | |
| 2009/0128683 | A1 * | 5/2009 | Matsumoto | 348/345 |
| 2009/0268075 | A1 * | 10/2009 | Yumiki | 348/333.05 |
| 2010/0045849 | A1 * | 2/2010 | Yamasaki | 348/349 |
| 2010/0110272 | A1 * | 5/2010 | Sugawara | 348/341 |
| 2010/0150539 | A1 | 6/2010 | Kusaka | |
| 2010/0238343 | A1 * | 9/2010 | Kawarada | 348/345 |
| 2011/0205423 | A1 * | 8/2011 | Tsukada | 348/345 |

FOREIGN PATENT DOCUMENTS

| CN | 101013190 A | 8/2007 |
| EP | 981245 A2 | 2/2000 |
| EP | 2157545 A1 | 2/2010 |
| JP | S60-086517 A | 5/1985 |
| JP | 3-214133 A | 9/1991 |
| JP | 7-111614 A | 4/1995 |
| JP | H07-062732 B2 | 7/1995 |
| JP | 2010191081 A | 9/2010 |

\* cited by examiner

*Primary Examiner* — Twyler Haskins
*Assistant Examiner* — Fayez Bhuiyan
(74) *Attorney, Agent, or Firm* — Canon USA Inc. IP Division

(57) ABSTRACT

A focus adjustment apparatus includes a diaphragm aperture adjustment unit configured to adjust a diaphragm aperture area of a photographic lens, a focus detection unit configured to detect a defocusing amount by using a pair of light fluxes passed through different areas of the photographic lens, a detection result correction unit configured to calculate, during focus detection after the diaphragm aperture area has changed by a value equal to or larger than a predetermined value, a reduced defocusing amount correction value with respect to the defocusing amount, and a focus adjustment unit configured to execute control to adjust a focus based on the defocusing amount correction value.

9 Claims, 14 Drawing Sheets

FIG.3B
FIG.3A
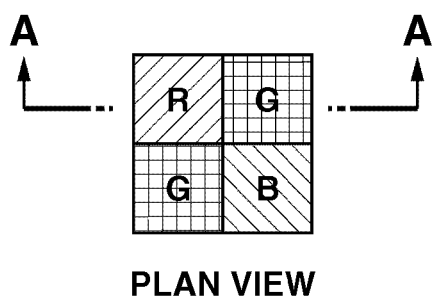
PLAN VIEW
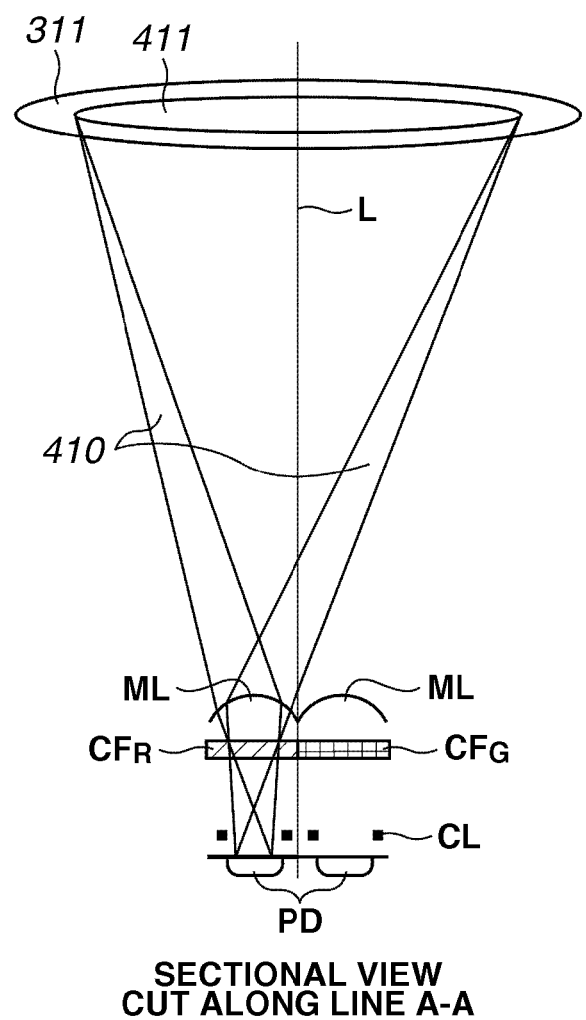
SECTIONAL VIEW
CUT ALONG LINE A-A

PLAN VIEW

SECTIONAL VIEW
CUT ALONG LINE A-A

FOCUS ADJUSTMENT APPARATUS

BACKGROUND OF THE INVENTION

1. Field of the Invention

The present invention relates to a focus adjustment apparatus that performs focusing in an imaging apparatus such as a digital still camera, a video camera or a film-based camera.

2. Description of the Related Art

As a general system that uses a light flux passed through a photographic lens in a focus detection and adjustment method of a camera, there are a contrast detection system and a phase difference detection system.

The contrast detection system is frequently used in the video camera or the digital still camera, and an image sensor is used as a focus detection sensor. This system determines, by focusing on an output signal of the image sensor, particularly information of a high-frequency component (contrast information), a position of the photographic lens where its evaluation value is largest as an in-focus position.

However, as it is referred to as a hill-climbing method, the system must acquire an evaluation value by slightly moving a focus position of the photographic lens, and move the focus position until the evaluation value is found to be largest. Hence, the system is not suited to a high-speed focus detection operation.

Focus detection of the phase difference detection system is a technology frequently used in a single-lens reflex camera, which has contributed to practical use of a single-lens reflex camera with automatic focus (AF) detection. For example, in a digital single-lens reflex camera, a focus detection unit that includes a secondary imaging optical system performs AF of the phase difference detection system.

The focus detection unit includes a pupil dividing unit that divides a light flux passed through an exit pupil of the photographic lens into two areas. The light flux divided into the two areas forms, via an optical path division optical system located in a mirror box, an image on a set of focus detection sensors by the secondary imaging optical system. Then, by detecting a shifting amount of a signal output according to light reception amounts of the sensors, namely, a relative positional shifting amount in a pupil dividing direction, a shifting amount in a focus direction of the photographic lens is directly acquired.

Thus, a defocusing amount and a defocusing direction are simultaneously acquired through a storage operation by the focus detection sensor. This enables a high-speed focus adjustment operation. During imaging after the focus detection, the optical path division optical system is retracted outside the imaging light flux, and the image sensor is exposed to acquire a captured image.

There is a technology for achieving high-speed AF even during electronic viewfinder observation or moving image capturing where an AF function of the phase difference detection system is provided to the image sensor, and a display unit such as a backside liquid crystal checks an image in real time. For example, there has been developed a technology for providing, in a certain light receiving element (pixels) of the image sensor, a pupil dividing function by setting a sensitivity area of a light reception unit eccentric from an optical axis of an on-chip microlens.

AF of the phase difference detection system is performed by using the pixels as focus detection pixels and arranging the pixels at a predetermined interval in a group of imaging pixels. Arranging places of the focus detection pixels correspond to defective portions of the imaging pixels, and hence surrounding imaging pixel information is interpolated to generate image information. In this example, AF of the phase difference detection system can be executed on an imaging plane. Thus, high-speed and highly accurate focus detection can be performed even during electronic viewfinder observation or moving image capturing.

During the electronic viewfinder observation or the moving image capturing, an amount of light reaching the image sensor is adjusted or a blur amount of a captured image is adjusted according to a user's image forming intension. This may necessitate adjustment of a diaphragm aperture diameter of the photographic lens. It is desired that an image that is always placed in in-focus state by focus adjustment is captured even in such a situation. However, since focus detection and adjustment are executed by the light flux passed through the photographic lens, the above-mentioned focus detection and adjustment method is affected in no small part by a change in diaphragm aperture diameter of the photographic lens.

To deal with this problem, Japanese Patent Application Laid-Open No. 7-111614 discusses a technology for inhibiting a focus adjustment operation when a diaphragm aperture diameter is adjusted in focus adjustment of the contrast detection system. This technology can prevent an erroneous focus detection operation when the diaphragm aperture diameter is adjusted.

Japanese Patent Application Laid-Open No. 03-214133 discusses a technology for correcting, in focus detection of the phase difference detection system, when a diaphragm of the photographic lens blocks (vignettes) a light flux used for the focus detection, an output signal in view of an amount of light that has not reached the focus detection unit due to the blocked light flux. This technology enables highly accurate focus detection by correcting the output signal according to a vignetting state of the light flux used for the focus detection even when the diaphragm aperture diameter is adjusted However, in the technology discussed in Japanese Patent Application Laid-Open No. 7-111614, the inhibition of the focus adjustment operation creates a possibility that when an object moves, the system will not be able to follow the movement, resulting in capturing of an out-of focus image. The out-of focus image may be captured even while a focus adjustment operation is executed again after a predetermined period of time. In both cases, there is a possibility that an image felt unnatural during observation may be recorded as a moving image.

In the technology discussed in Japanese Patent Application Laid-Open No. 03-214133, the correction of the light amount of the focus detection signal in view of vignetting of the photographic lens is performed based on design information of the photographic lens side. However, a degree of vignetting is determined by several frame members including a diaphragm aperture of the photographic lens, and each component has a manufacturing error in external shape or arrangement. Hence, even when the amount of light is corrected based on only the design information of the photographic lens, there is a possibility that an error may occur in focus detection result.

In other words, during the moving image capturing, when a change in diaphragm aperture diameter is accompanied by a change in degree of vignetting, a focus detection result may vary between before and after the change in diaphragm aperture diameter due to the error. Nevertheless, when the photographic lens is driven according to the acquired focus detection result including the error, discontinuous points may be generated in a focus adjustment state of an image being captured, creating a possibility that an image felt unnatural during observation may be recorded as a moving image.

SUMMARY OF THE INVENTION

The present invention is directed to a focus adjustment apparatus and an imaging apparatus including the same, which can display and record an image without giving to a user of the imaging apparatus any unnatural feeling even when a change in diaphragm aperture diameter of a photographic lens affects focus detection and an adjustment result.

According to an aspect of the present invention, a focus adjustment apparatus includes a diaphragm aperture adjustment unit configured to adjust a diaphragm aperture area of a photographic lens, a focus detection unit configured to detect a defocusing amount by using a pair of light fluxes passed through different areas of the photographic lens, a detection result correction unit configured to calculate, during focus detection after the diaphragm aperture area has changed by a value equal to or larger than a predetermined value, a reduced defocusing amount correction value with respect to the defocusing amount, and a focus adjustment unit configured to execute control to adjust a focus based on the defocusing amount correction value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate a structure of imaging pixels of the image sensor.

DESCRIPTION OF THE EMBODIMENTS

Various exemplary embodiments, features, and aspects of the invention will be described in detail below with reference to the drawings.

The present invention provides a configuration where during focus detection after a diaphragm aperture area changes by a predetermined value or more, a reduced defocusing amount correction value is calculated for a defocusing amount by a certain method, and focus adjustment is performed based on the defocusing amount correction value.

A possibility is not small that the defocusing amount detected after the change in diaphragm aperture area may suddenly increase for various reasons or include errors at certain rates.

Thus, according to the present invention, the reduced defocusing adjustment correction amount is solely calculated without executing focus adjustment based on the detected amount and irrespective of reliability of the detected amount and, based on the reduced defocusing amount correction value, the focus adjustment is performed by reducing the discontinuity of the focus adjustment state and the influence of errors. Based on this idea, a focus adjustment apparatus according to the present invention includes various components described above in the summary of the invention.

Figure 1:
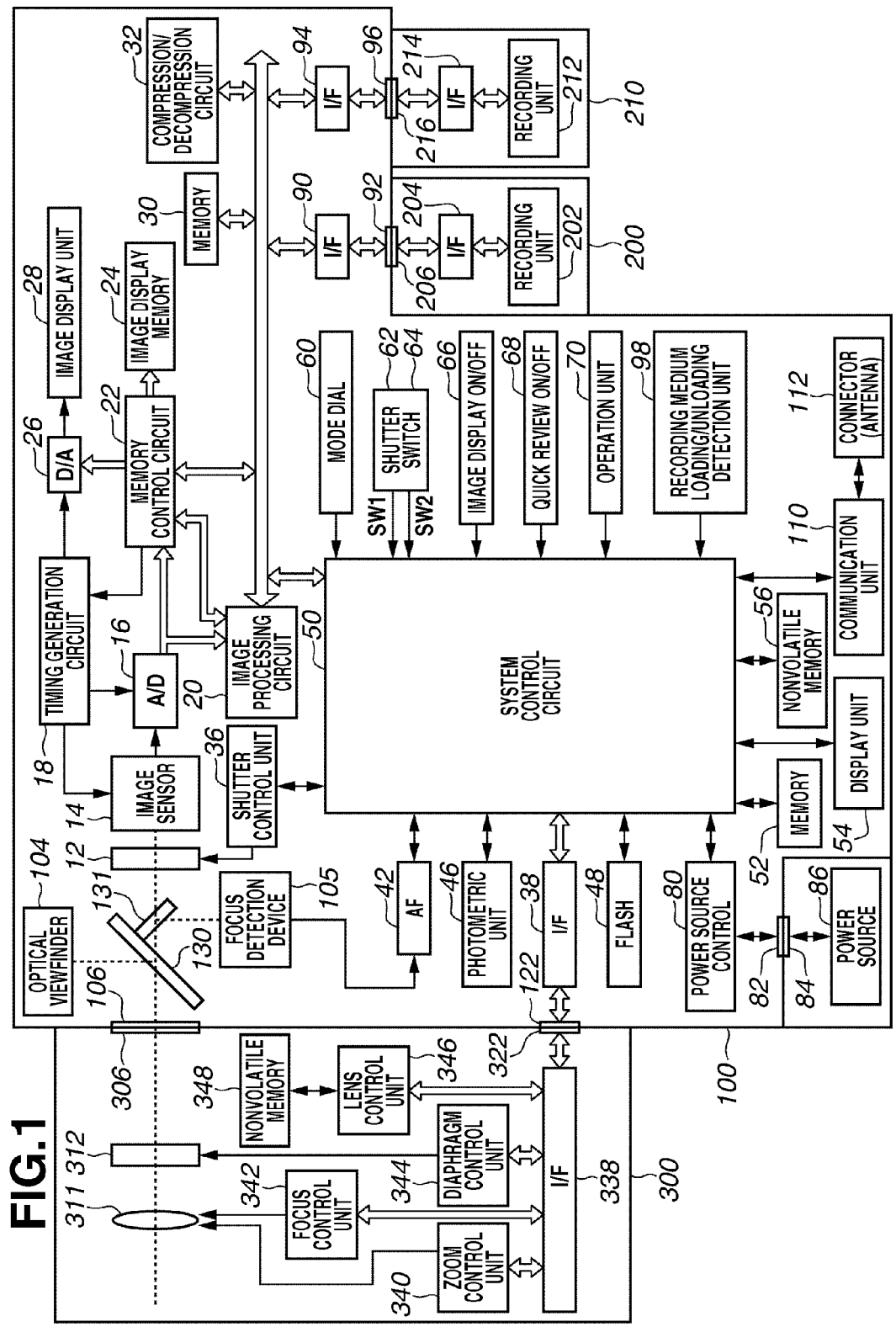
FIG. 1 is a block diagram illustrating a configuration of camera system according to a first exemplary embodiment of the present invention.

FIG. 1 illustrates a configuration of an imaging apparatus, namely, a camera system that includes a camera where a plurality of photographic lens units can be replaced, the photographic lenses, and a focus adjustment apparatus. In FIG. 1, there are shown a camera 100 and a photographic lens 300 interchangeably mounted on the camera in the camera system that includes the focus adjustment apparatus according to an exemplary embodiment. First, the camera 100 side is described.

The camera 100 can be used for the camera system where a plurality of types of photographic lenses 300 are present, and lenses of the same type but different in manufacturing number can be loaded. Photographic lenses 300 different in focal distance or open F number, or a photographic lens 300 having a zoom function can be mounted. Imaging lenses are interchangeable irrespective of similar or different types.

In the camera 100, a light flux that has passed through the photographic lens 300 is transmitted through a camera mount 106, and reflected upward by a main mirror 130 to enter an optical viewfinder 104. Through the optical viewfinder 104, a user of the camera 100 can capture an image while observing an object as an optical image. In the optical viewfinder 104, a certain function of a display unit 54, such as an in-focus display, a camera shake warning display, a diaphragm value display, or an exposure correction display, is arranged.

The main mirror 130 includes a half-transmissive half mirror. A part of the light flux entering the main mirror 130 is passed through the half mirror, and reflected downward by a sub-mirror 131 to enter a focus detection device 105.

The focus detection device 105 employs an AF mechanism of a phase difference detection system that includes a secondary imaging optical system, and converts the acquired optical image into an electric signal to transmit it to an AF unit 42. The AF unit 42 performs focus detection calculation based on the electric signal.

Based on a result of the calculation, a system control circuit 50 controls focus adjustment for a focus control unit 342 (described below) of the photographic lens 300 side. According to the present exemplary embodiment, the AF unit 42 also corrects a focus detection result. The AF unit 42 corresponds to a detection result correction unit in claims.

When still image capturing, observation at the electronic viewfinder, and moving image capturing are performed after the end of the focus adjustment of the photographic lens 300, the main mirror 130 and the sub-mirror 131 are retracted outside the imaging light flux by a quick return mechanism (not illustrated). The light flux thus transmitted through the photographic lens 300 enters, via a shutter 12 for controlling an exposure amount, an image sensor 14 that converts the optical image into an electric signal.

After the end of such imaging operation, the main mirror 130 and the sub-mirror 131 return to illustrated positions.

The electric signal converted by the image sensor 14 is transmitted to an analog/digital (A/D) converter 16, and an analog output is converted into a digital signal (image data). A timing generation circuit 18 supplies a clock signal or a control signal to the image sensor 14 and A/D converter 16, and a D/A converter 26. A memory control circuit 22 and a system control circuit 50 control the timing generation circuit 18.

An image processing circuit 20 executes predetermined pixel interpolation or color conversion for image data from the A/D converter 16 or image data from the memory control circuit 22. The image processing circuit 20 executes predetermined calculation by using the image data.

The image sensor 14 includes a part of the focus detection unit, and can execute phase difference detection system AF even in the retracted state of the maim mirror 130 and the sub-mirror 131 outside the imaging light flux by the quick return mechanism. Image data corresponding to focus detection among the acquired image data is converted into focus detection image data by the image processing unit 20.

The image data is then transmitted to the AF unit 42 via the system control circuit 50, and the focus adjustment unit focuses the photographic lens 300. Based on a result of calculating the image data of the image sensor 19 by the image processing circuit 20, contrast system AF can be performed where the system control circuit 50 controls the focus control unit 342 of the photographic lens 300 to be in focus.

Thus, during the electronic viewfinder observation or the moving image capturing, while the main mirror 130 and the sub-mirror 131 are retracted outside the imaging light flux, the phase difference detection system AF and the contrast system AF can both be performed by the image sensor 14. Particularly, high-speed focusing is enabled because the phase difference detection system AF can be performed.

Thus, in the camera 100 according to the present exemplary embodiment, for normal still image capturing where the main mirror 130 and the sub-mirror 131 are in the imaging light flux, the phase difference detection system AF by the focus detection device 105 is used.

During the electronic viewfinder observation or the moving image capturing where the main mirror 130 and the sub-mirror 131 are retracted outside the imaging light flux, the phase difference detection system AF and the contrast system AF by the image sensor 14 are used. This enables focus adjustment in any of the still image capturing, electronic viewfinder observation, and the moving image capturing.

The memory control circuit 22 controls the A/D converter 16, the timing generation circuit 18, the image processing circuit 20, an image display memory 24, the D/A converter 26, a memory 30, and a compression/decompression circuit 32. Data of the A/D converter 16 is written in the image display memory 24 or the memory 30 via the image processing circuit 20 and the memory control circuit 22 or directly via the memory control circuit 22.

An image display unit 28 includes a liquid crystal monitor, and displays display image data written in the image display memory 24 via the D/A converter 26.

Sequentially displaying the captured image data by using the image display unit 28 can achieve the electronic viewfinder function. The image display unit 28 can arbitrarily switch displaying ON/OFF according to an instruction from a system control circuit 50. When the displaying is switched OFF, power consumption of the camera 100 can be greatly reduced.

As described above, during the electronic viewfinder observation or the moving image capturing, the main mirror 130 and the sub-mirror 131 are retracted outside the imaging light flux by the quick return mechanism. In this case, therefore, use of focus detection by the focus detection device 105 is inhibited.

Thus, the camera 100 according to the present exemplary embodiment is configured to perform AF of the phase difference detection system by the focus detection unit included in the image sensor 14. This enables focus adjustment of the photographic lens 300 in both of the optical viewfinder and the electronic viewfinder. Needless to say, during the electronic viewfinder observation or the moving image capturing, focus detection of the contrast system can be performed.

The memory 30 stores a captured still or moving image, and has a capacity enough to store a predetermined number of still images or moving images of a predetermined period of time. Thus, even in the case of continuous imaging or panoramic imaging, a great amount of images can be written in the memory 30 at a high speed.

The memory 30 can be used as a work area of the system control circuit 50. The compression/decompression circuit 32 has a function of compressing/decompressing image data by adaptive discrete cosine transform (ADCT). The compression/decompression circuit 32 reads the image stored in the memory 30 to compress or decompress it, and writes processed image data in the memory 30.

A shutter control unit 36 controls, based on photometric information from a photometric unit 46, a shutter 12 in association with a diaphragm control unit 344 that controls a diaphragm 312 of the photographic lens 300 side. An interface unit 38 and a connector 122 electrically interconnects the camera 100 and the photographic lens 300.

There are functions of transmitting a control signal, a state signal, or a data signal, and supplying currents of various voltages between the camera 100 and the photographic lens 300. Not only electric communication but also optical communication and audio communication can be performed.

The photometric unit 46 performs automatic exposure (AE) processing. Entering the light flux passed through the photographic lens 300 to the photometric unit 46 via the camera mount 106, the mirror 130, and a photometric lens (not illustrated) enables measurement of an image exposure state.

The photometric unit 46 has an FE processing function in association with a flash 48. Based on a result of calculating the image data of the image sensor 14 by the image processing circuit 20, the system control circuit 50 can perform AE control for the shutter control unit 36 and the diaphragm control unit 344 of the photographic lens 30C. The flash 48 has a projection function of AF auxiliary light and a flash light control function.

The system control circuit 50 controls the entire camera 100, and a memory 52 stores a constant, a variable, or a program for operating the system control circuit 50. A display unit 54 is a liquid crystal display device that displays an operation state or a message by using a character, an image, or a voice according to program execution at the system control circuit 50.

A single or a plurality of display units 54 are installed in easily viewed positions near an operation unit of the camera 100, and each includes a combination of, for example, a liquid crystal display (LCD) and a light emitting diode (LED). Those among display contents of the display unit 54 to be displayed on the LCD include information regarding the number of photographs such as the number of captured images or a remaining number to be photographed, and information regarding imaging conditions such as a shutter speed, a diaphragm value, exposure correction, and a flash. In addition, a remaining battery level, and a date and time are displayed.

The display unit 54 has, as described above, some functions provided in the optical viewfinder 104. A nonvolatile memory 56 is an electrically erasable and recordable memory. For example, an electrically erasable programmable read-only memory (EEPROM) is used. Operation units 60, 62, 64, 66, 68, and 70 input various operation instructions of the system control circuit 50, each of which includes a single or a plurality of combinations of a switch or a dial, a touch panel, a pointing device based on line-of-sight detection, and a voice recognition device.

The mode dial switch 60 can switch and set function modes including a power-off mode, an automatic imaging mode, a manual imaging mode, a reproduction mode, and a personal computer (PC) connection mode.

The operation unit 62 that is a shutter switch SW 1 is turned ON by half-pressing a shutter button (not illustrated) to instruct a start of AF, AE, automatic white balance (AWB) processing, or EF processing. The operation unit 64 that is a shutter switch SW 2 is turned ON by fully pressing the shutter button to instruct a start of series of imaging processes.

The imaging processes include exposure, development, and recording processing. In the exposure, a signal read from the image sensor 14 is written as image data in the memory 30 via the A/D converter 16 and the memory control circuit 22.

The development is executed by using calculation at the image processing circuit 20 or the memory control circuit 22. In the recording, the image data is read from the memory 30, compressed by the compression/decompression circuit 32, and written in a recording medium 200 or 210.

The image display ON/OFF switch 66 can set the image display unit 28 ON/OFF. This function enables power saving by blocking current supplied to the image display unit including the liquid crystal monitor during imaging executed by using the optical viewfinder 104.

The quick review ON/OFF switch 68 sets a quick review function for automatically reproducing image data captured immediately after imaging. The operation unit 70 includes various buttons and a touch panel. Various buttons include a menu button, a flash setting button, a single imaging/continuous imaging/self-timer switching button, and an exposure correction button.

A power control unit 80 includes a battery detection circuit, a direct current (DC)/DC converter, and a switch circuit for switching a block to be energized. The power control unit 80 detects presence of a loaded battery, a type of the battery, and a battery remaining level, controls the DC/DC converter based on a detection result and an instruction from the system control circuit 50, and supplies a necessary voltage to the units including the recording medium for a necessary period of time.

Connectors 82 and 84 connect a primary battery such as an alkaline battery or a lithium battery, a secondary battery such as NiCd battery or a NiMH battery, and a power source unit 86 including an alternate current (AC) adaptor to the camera 100. Interfaces 90 and 94 have connection functions with a recording medium such as a memory card or a hard disk, and connectors 92 and 96 physically connect with the recording medium such as a memory card or a hard disk.

A recording medium loading/unloading detection unit 98 detects loading of the recording medium on the connector 92 or 96. According to the present exemplary embodiment, there are two systems of interfaces and connectors to load the recording medium. However, a single or a plurality of systems of interfaces and connectors can be installed. Interfaces and connectors of different standards can be installed.

Connecting various communication cards such as a local-area-network (LAN) card to the interface and the connector enables transfer of the image data and management information attached to the image data with other peripheral devices such as a computer and a printer. A communication unit 110 has various communication functions such as wire communication and wireless communication.

A connector 112 connects the camera 100 to the other devices by the communication unit 110, and serves as an antenna in the case of wireless communication. The recording media 200 and 210 are memory cards or hard disks. Each of the recording media 200 and 210 includes a recording unit 202 including a semiconductor memory or a magnetic disk, an interface 204 with the camera 100, and a connector 206 for connection with the camera 100.

Next, the photographic lens 300 side is described. The photographic lens 300 is detachable from the camera 100. A lens mount 306, which mechanically couples the photographic lens 300 with the camera 100, is interchangeably fixed to the camera 100 via the camera mount 106.

The camera mount 106 and the lens mount 306 include functions of a connector 122 and a connector 322 for electrically connecting the photographic lens 300 to the camera 100. A lens 311 includes a focus lens for focusing an object, and a diaphragm 312 controls an amount of an imaging light flux.

The connector 322 and an interface 338 electrically connect the photographic lens 300 to the connector 122 of the camera 100. The connector 322 has functions of transferring a control signal, a state signal, or a data signal between the photographic lens 300 and the camera 100, and receiving or supplying currents of various voltages.

The connector 322 can be configured to execute not only electric communication but also optical communication and audio communication. A zoom control unit 340 controls zooming of the lens 311, and a focus control unit 342 controls an operation of the focus lens of the lens 311. When the photographic lens 300 is a single-focus lens type having no zoom function, the zoom control unit 340 can be removed.

The diaphragm control unit 344 controls, based on the photometric information from the photometric unit 46, the diaphragm 312 in association with the shutter control unit 36 that controls the shutter 12. The diaphragm 312 and the diaphragm control unit 344 correspond to a diaphragm aperture adjustment unit in claims.

A lens system control unit 346 controls the entire photographic lens 300. The lens system control unit 346 has a memory function of storing a constant, a variable, or a program for a photographic lens operation.

A nonvolatile memory 348 stores identification information such as a number unique to the photographic lens, management information, function information such as a full-aperture F value, a minimum diaphragm value or a focal distance, and present and past setting values. According to the present exemplary embodiment, the nonvolatile memory 348 also stores lens frame information according to a state of the photographic lens 300. This lens frame information is information regarding a distance of a frame opening from the image sensor 14 and a radius of the frame opening that determine a light flux passed through the photographic lens.

The diaphragm 312 is included in a frame that determines the light flux passed through the photographic lens, and others such as an opening of a lens frame component for holding the lens correspond to frames. The frame that determines the light flux passed through the photographic lens varies depending on a focus position or a zoom position of the lens 311, and hence a plurality of frames are prepared corresponding to the focus position and the zoom position of the lens 311.

When the camera 100 performs focus detection by using the focus detection unit, optimal lens frame information corresponding to the focus position and the zoom position of the lens 311 is selected to be transmitted through the connector 322 to the camera 100.

The configuration of the camera system that includes the camera 100 and the photographic lens 300 has been described. Next, the focus detection unit that includes the image sensor 14 is described in detail. The focus detection unit employs AF of the phase difference detection system as in the case of the focus detection device 105. A configuration of the focus detection unit is described.

Figure 2:
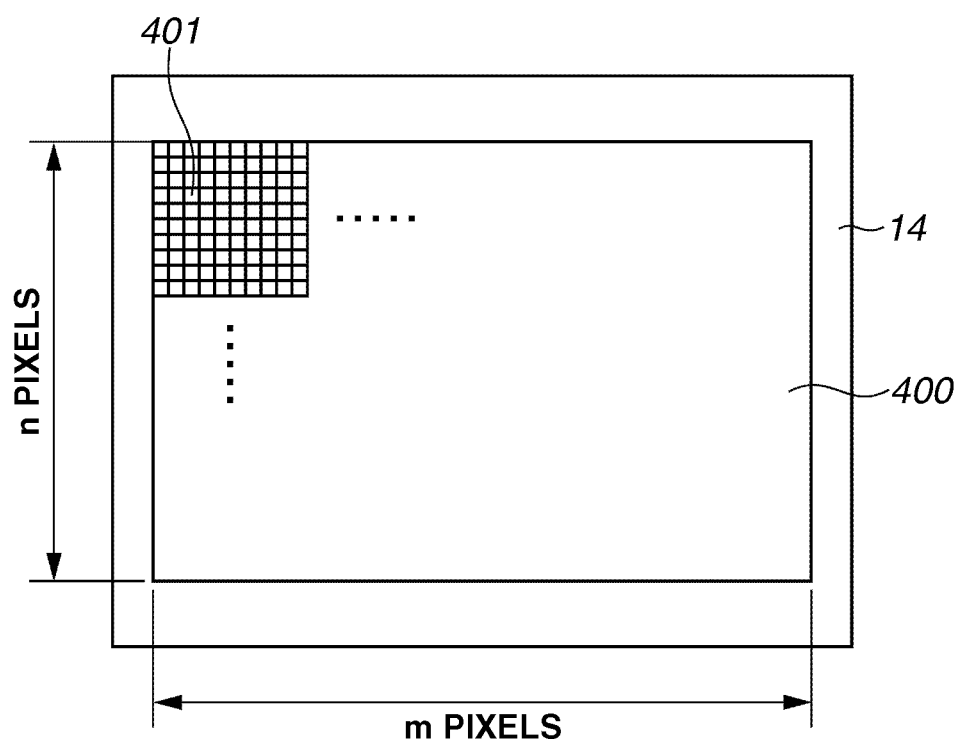
FIG. 2 is a plan view illustrating light receiving pixels of an image sensor on which an object image is formed when seen from a photographic lens side.

FIG. 2 is a plan view illustrating light receiving pixels where an object image is formed in the image sensor 14 illustrated in the camera system block diagram of FIG. 1 when seen from the photographic lens 300 side. Specifically, FIG. 2 illustrates an imaging range 400 of all pixels including m pixels in a horizontal direction and n pixels in a vertical direction on the image sensor 14, and one pixel portion 401.

Each pixel portion includes primary color filters formed in an on-chip Bayer arrangement, and pixels are arranged at a cycle of four pixels of 2×2. In FIG. 2, to eliminate complexity, only an upper left pixel portion including 10 pixels×10 pixels is displayed while other pixel portions are omitted.

Figure 4A:
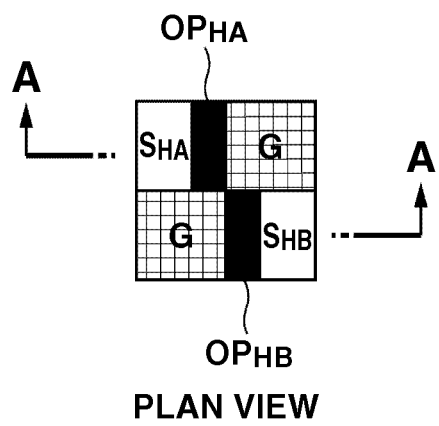
FIGS. 4A and 4B illustrate a structure of focus detection pixels of the image sensor.
Figure 4B:
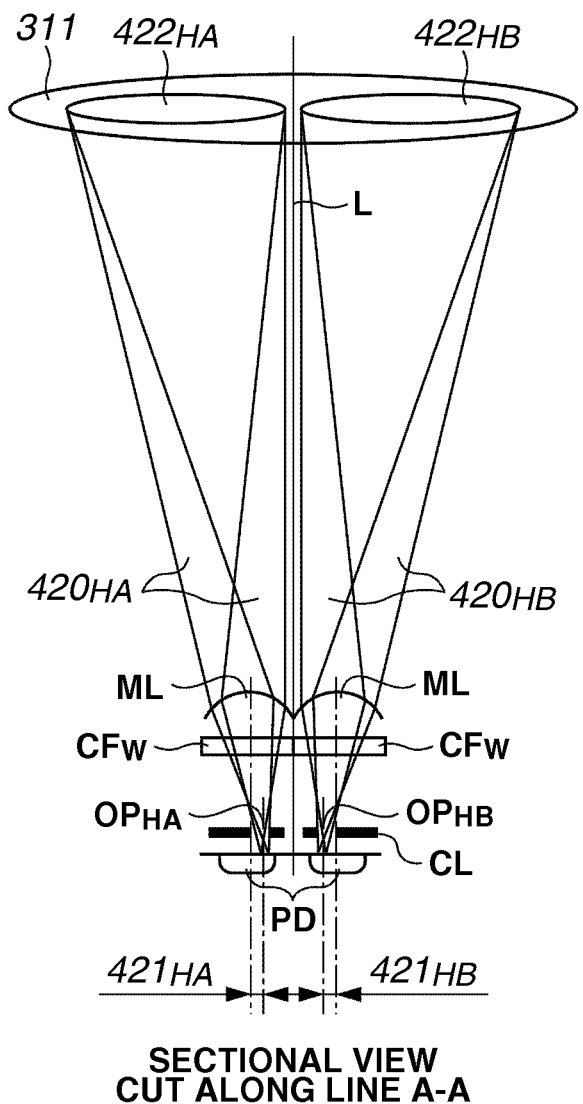

FIGS. 3A and 3B and FIGS. 4A and 4B illustrate structures of imaging pixels and focus detection pixels included in the pixel portion. FIGS. 3B and 4B are optical sectional views illustrating the lens 311 and the image sensor 14 illustrated in FIG. 1 when seen from the optical viewfinder 104 side. Members unnecessary for description are omitted.

The present exemplary embodiment employs the Bayer arrangement where diagonal two of the four pixels of 2×2 are pixels having green (G) spectral sensitivities and the other two are pixels respectively having red (R) and blue (B) spectral sensitivities. In the Bayer arrangement, a focus detection pixels having a structure described below is disposed.

FIGS. 3A and 3B illustrate an arrangement and a structure of imaging pixels. FIG. 3A is a plan view illustrating imaging pixels of 2×2. In the Bayer arrangement, G pixels are located in a diagonal direction, and the other two are pixels of R and B. This structure of 2×2 pixels is repeatedly arranged.

FIG. 3B that is a sectional view cut along the line A-A illustrated in FIG. 3A illustrates an on-chip microlens ML located at the foreground of each pixel, a R color filter $CF_R$, and a G color filter $CF_G$.

A photodiode (PD) is a schematically illustrated photoelectric conversion element of a complimentary metal-oxide semiconductor (CMOS) image sensor. A contact layer (CL) is a wiring layer to form a signal line for transmitting each of various signals in the CMOS image sensor. FIGS. 3A and 3B illustrate pixels near a center in the image sensor 14, namely, a pixel structure near an axis of the photographic lens 300.

The on-chip microlens ML and the photoelectric conversion element PD for the imaging pixels are configured to capture the light flux passed through the photographic lens 300 as effectively as possible. In other words, an exit pupil 411 of the photographic lens 300 and the photoelectric conversion element PD are in conjugate relationship with each other because of the microlens ML, and an effective area of the photoelectric conversion element is designed to be large.

A light flux 410 illustrated in FIG. 3B indicates this status, and an entire area of the exit pupil 411 is captured by the photoelectric conversion element PD. The incident light flux of the R pixel has been described referring to FIG. 3B. The G pixel and the B pixel have similar structures. Members around the microlens ML are illustrated in an enlarged manner for easier understanding. In reality, these members are micrometers in size.

FIGS. 4A and 4B illustrate an arrangement and a structure of focus detection pixels for horizontal (lateral) pupil division of the photographic lens 300. The horizontal direction corresponds to a longitudinal direction of the image sensor 14 illustrated in FIG. 2. FIG. 4A is a plan view illustrating pixels of 2×2 including focus detection pixels.

To obtain an image signal for recording or viewing, a main component of luminance information in the G pixel is acquired. Human image recognition characteristics are sensitive to the luminance information, and hence image deterioration is easily recognized when the G pixel is damaged.

The R pixel and the B pixel are for acquiring color information (color difference information). Human visual characteristics are insensitive to the color information, and hence image deterioration is difficult to be recognized even when some damages occur in the pixel for acquiring the color information.

Thus, according to the present exemplary embodiment, among the pixels of 2×2, the R pixel and the B pixel are replaced by focus detection pixels while the G pixel is left as the imaging pixel. FIG. 4A illustrates focus detection pixels $S_{HA}$ and $S_{HB}$.

FIG. 9B is a sectional view cut along the line A-A illustrated in FIG. 4A. A microlens ML and a photoelectric conversion element PD are similar in structure to those of the imaging pixel. Pixels near the center of the image sensor 14, namely, a pixel structure near the axis of the photographic lens 300, is illustrated.

According to the present exemplary embodiment, no signal of the focus detection pixel is used for image generation, and hence a transparent film CF (white) is disposed in place of a color separation color filter. Since the exit pupil 911 is divided by the image sensor, an opening portion of the wiring layer CL is set eccentric in one direction with respect to a center line of the microlens ML.

Specifically, an opening portion $OP_{HA}$ of the pixel $S_{HA}$ is eccentric to the right by $421_{HA}$ with respect to the center line of the microlens ML. Hence, a light flux $420_{HA}$ passed through a left exit pupil $422_{HA}$ sandwiching an optical axis L of the lens 311 is received. Similarly, since an opening portion $OP_{HB}$ of the pixel $S_{HB}$ is eccentric to the left by $421_{HB}$ with respect to the center line of the microlens ML, a light flux $420_{HB}$ passed through a right exit pupil $422_{HB}$ sandwiching the optical axis L of the lens 311 is received.

As clear from FIG. 4B, the eccentric amount $421_{HA}$ is equal to the eccentric amount $421_{HB}$. Thus, the eccentricity between the opening portion OP and the microlens ML enables extraction of light fluxes 420 passed through different pupil areas of the photographic lens 300.

In this configuration, a plurality of pixels $S_{HA}$ are horizontally arranged, and an object image acquired in the group of pixels is set as an A image. Pixels $S_{HB}$ are also horizontally arranged, and an object image acquired in the group of pixels is set as a B image. Detecting relative positions of the A image and the B image enables detection of out-of-focus amounts (defocusing amounts) of the object images.

The image sensor 19 accordingly has a function as a second focus detection unit, and simultaneously a second pupil division unit.

FIGS. 4A and 4B illustrate the focus detection pixels near the center of the image sensor 14. In other than the center, setting the opening portions $OP_{HA}$ and $OP_{HB}$ of the microlens ML and the wiring layer CL eccentric in a state different from that illustrated in FIG. 4B enables division of the pupil 911.

Specifically, taking the opening portion $OP_{HA}$ as an example, the opening portion $OP_{HA}$ is set eccentric in a manner of aligning a spherical core of the roughly spherical microlens ML with a line connecting a center of the opening portion $OP_{HA}$ with a center of the exit pupil area. Hence, even around the image sensor 14, pupil division almost similar to that for the focus detection pixel near the center illustrated in FIGS. 4A and 4B can be executed.

In the pixels $S_{HA}$ and $S_{HB}$, a focus can be detected for an object having a luminance distribution in a horizontal direction on an imaging plane, for example, a vertical line. However, a focus cannot be detected for a horizontal line having a luminance distribution in a vertical direction. To enable this focus detection, pixels for vertically dividing the pupil of the photographic lens can be disposed. According to the present exemplary embodiment, focus detection pixel structures are arranged in both vertical and horizontal directions.

The focus detection pixels have no original color information. Hence, to form a captured image, interpolation calculation is performed from surrounding pixel signals to generate a signal. Focus detection pixels are accordingly arranged not continuously but discretely in the image sensor 14. As a result, image quality of the captured image is not deteriorated.

As described above referring to FIG. 2, FIGS. 3A and 3B, and FIGS. 4A and 4B, the image sensor 14 has not only the function of imaging but also the function as the focus detection unit. For a focus detection method, the inclusion of the focus detection pixel for receiving the light flux used for dividing the exit pupil 411 enables AF of the phase difference detection system.

Figure 5:
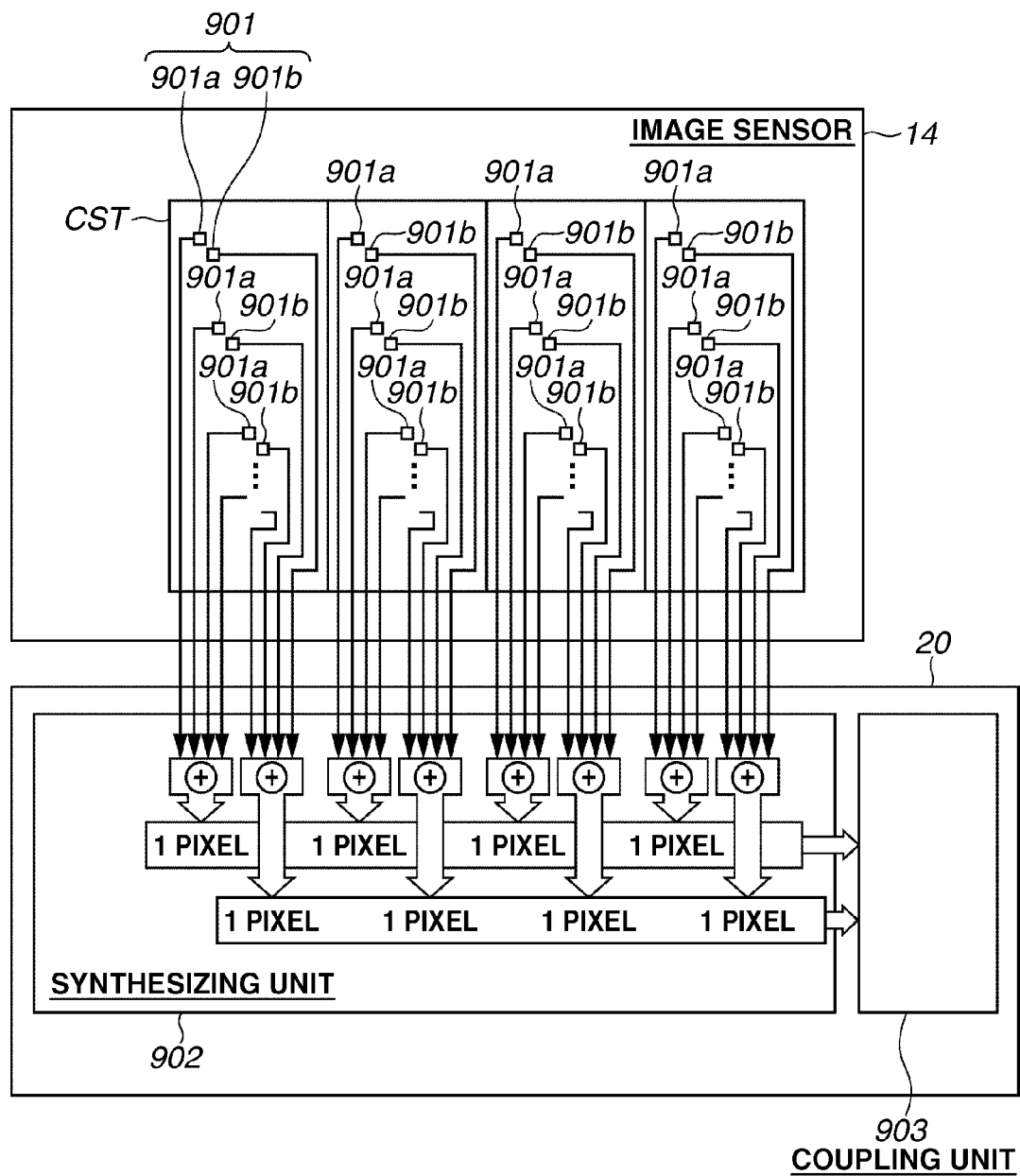
FIG. 5 schematically illustrates a focus detection configuration in the image sensor and an image processing unit.

FIG. 5 schematically illustrates a focus detection configuration in the image sensor 14 and the image processing unit 20. In the camera system illustrated in the block diagram of FIG. 1, the image data acquired in the image sensor 14 is transmitted to the image processing unit 20 via the A/D converter 16. For easier description, in FIG. 5, the A/D converter 16 is omitted.

The image sensor 14 includes a plurality of focus detection units 901, each of which includes pupil-divided focus detection pixels 901a and 901b. The focus detection unit 901 corresponds to the portion illustrated in FIG. 4A, and the focus detection pixel 901a corresponds to the pixel $S_{HA}$, and the focus detection pixel 901b corresponds to the pixel $S_{HB}$. The image sensor 14 includes a plurality of imaging pixels for photoelectrically converting object images formed by the photographic lens.

The image processing unit 20 includes a synthesizing unit 902 and a coupling unit 903. The image processing unit 20 allocates, to include a plurality of focus detection units 901, a plurality of sections (areas) CST to the imaging plane of the image sensor 14. The image processing unit 20 can appropriately change sizes, arrangement or the number of sections CST.

The synthesizing unit 902 synthesizes, in each of the plurality of sections CST allocated to the image sensor 14, output signals from the focus detection pixel 901a to acquire a first synthesized signal of one pixel. The synthesizing unit 902 synthesizes, in each section CST, output signals from the focus detection pixel 901b to acquire a second synthesized signal of one pixel.

The coupling unit 903 couples, in the plurality of sections CST, the first synthesized signals of the pixels to acquire a first coupled signal, and the second synthesized signals to acquire a second coupled signal. Thus, a coupled signal where the pixels corresponding to the number of sections are coupled together is acquired for each of the focus detection pixels 901a and 901b.

A calculation unit 904 calculates a defocusing amount of the photographic lens 300 based on the first and second coupled signals. Thus, to synthesize the output signals from the focus detection pixels in the same pupil-division direction, which have been arranged in the section, even when luminance of each focus detection unit is small, a luminance distribution of the object can be sufficiently detected.

Figure 6A:
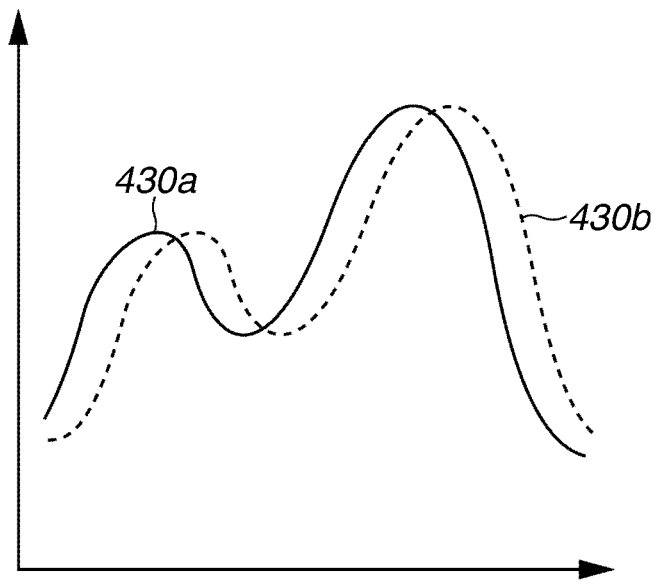
FIGS. 6A and 6B illustrate a pair of focus detection signals transmitted to an AF unit and a focus detection area within an imaging range.

FIG. 6A illustrates a pair of focus detection signals formed by the focus detection unit 901, the synthesizing unit 902, and the coupling unit 903 illustrated in FIG. 5 and transmitted to the AF unit 42. In FIG. 6A, a horizontal axis indicates a pixel array and a direction of the coupled signal, and a vertical axis indicates intensity of the signal.

A focus detection signal 430a and a focus detection signal 430b are respectively generated by the focus detection pixel 901a and the focus detection pixel 901b. The photographic lens 300 is in a defocused state with respect to the image sensor 14, and hence the focus detection signal 430a is shifted left while the focus detection signal 430b is shifted right.

Calculating shifting amounts of the focus detection signals 430a and 430b at the AF unit 42 based on well-known correlation calculation enables determination of a defocusing level of the photographic lens 300. Thus, the focus adjustment unit can perform focusing.

Figure 6B:
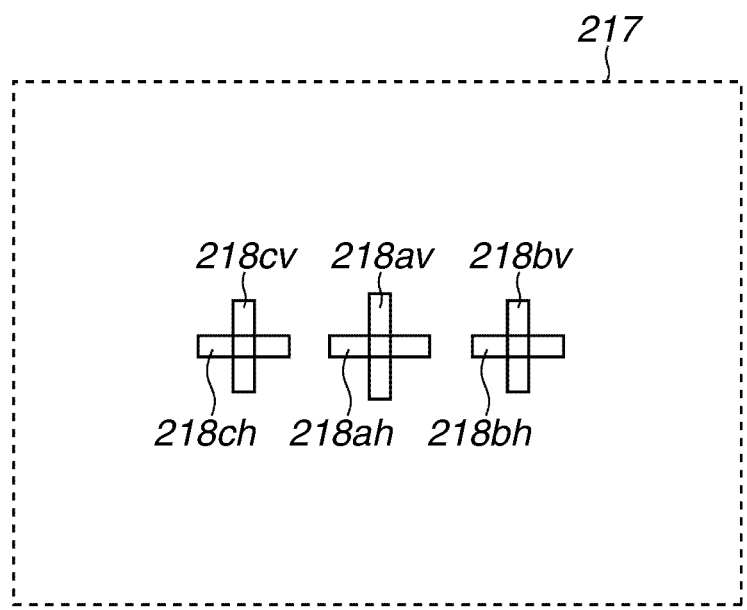

FIG. 6B illustrates a focus detection area within an imaging range. The image sensor 14 executes AF of the phase difference detection system in this focus detection area. The focus detection area illustrated in FIG. 6B includes, in addition to a focus detection unit including the pixel for horizontal pupil division of the photographic lens illustrated in FIG. 5, a focus detection unit including a pixel for vertical pupil division of the photographic lens.

In FIG. 6B, a dotted-line rectangle 217 indicates the imaging range where the pixels of the image sensor 14 are formed. Within the imaging range, three horizontal focus detection areas 218ah, 218bh, and 218ch, and three vertical focus detection areas 218av, 218bv, and 218cv are respectively formed. The vertical and horizontal focus detection areas are arranged to intersect each other, constituting a cross type focus detection area. According to the exemplary embodiment, cross type focus detection areas are located at totally three places, namely, a center and left and right sides of the imaging range 217.

In this configuration, the image sensor 14 achieves AF of the phase difference detection system. In the AF of the phase difference detection system, focus detection is executed by using, among light fluxes passed through the exit pupil 411 of the photographic lens 300, light fluxes passed through two different places.

This may cause, depending on an aperture size of the diaphragm 312, vignetting where the light fluxes used for the AF are blocked. Hereinafter, an influence of aperture adjustment by the diaphragm 312 on the phase difference AF of the image sensor 14 is described.

Figure 7A:
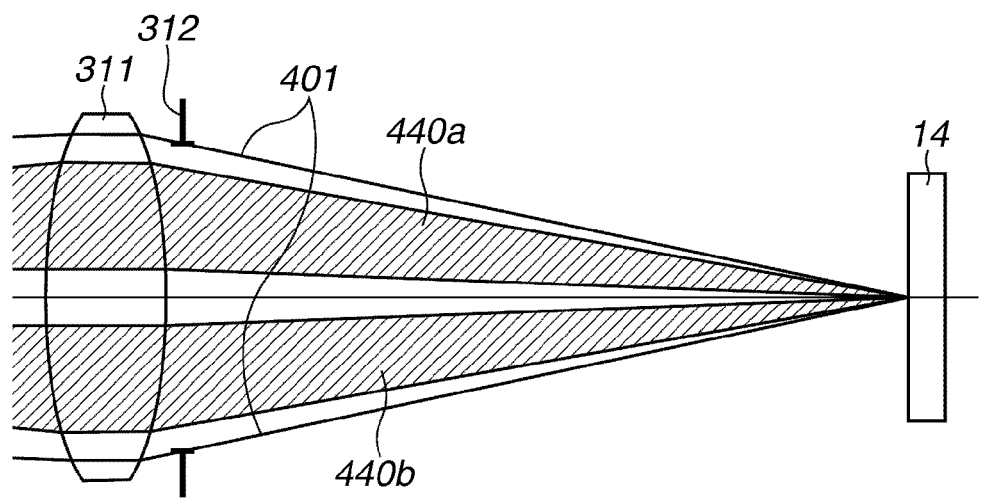
FIGS. 7A and 7B are optical sectional views illustrating a lens and the image sensor illustrated in FIG. 1 when seen from an optical viewfinder side.
Figure 7B:
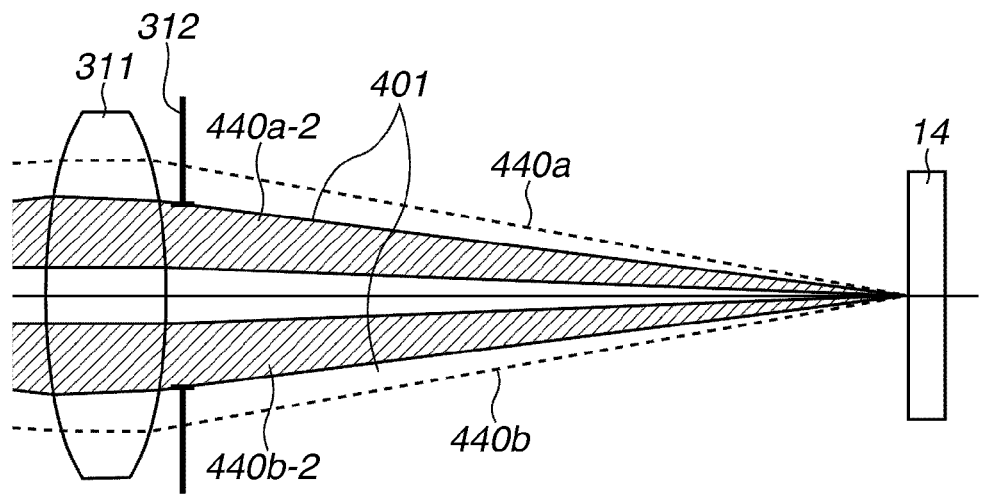

FIGS. 7A and 7B are optical sectional views of the lens 311 and the image sensor 14 seen from the optical viewfinder 104 side in the camera system block diagram of FIG. 1, illustrating a imaging light flux to form an image at the center of the image sensor 14 and a focus detection light flux of the AF of the phase difference detection system executed by the image sensor 14. Members other than the lens 311 and the image sensor 14 unnecessary for description are omitted.

In FIG. 7A, a solid-line light flux 401 is an imaging light flux passed through the lens 311 and the diaphragm 312 of the photographic lens 300 to form an image near a center of a light receiving surface of the image sensor 14. A pair of diagonal-line light fluxes 440a and 440b are, among the focus light fluxes received by the focus detection pixels 901a and 901b illustrated in FIG. 5, focus detection light fluxes to form images near the center of the light receiving surface of the image sensor 14. In FIG. 7A, the focus detection light fluxes are not vignetted by the diaphragm 312.

FIG. 7B illustrates a state where the diaphragm 312 illustrated in FIG. 7A is narrowed to reduce an aperture area. As in the case illustrated in FIG. 7A, a solid-line light flux 401 is an imaging light flux passed through the lens 311 and the diaphragm 312 of the photographic lens 300 to form an image near the center of the light receiving surface of the image sensor 14.

A pair of diagonal-lire light fluxes 440a-2 and 440b-2 illustrated in FIG. 7B are blocked by the diaphragm 312 with respect to the focus detection light fluxes illustrated in FIG. 7A. In FIG. 7B, broken-line light fluxes indicate the focus detection light fluxes 440a and 440b illustrated in FIG. 7A, namely, focus detection light fluxes that have not been vignetted.

During the electronic viewfinder observation or the moving image capturing, the diaphragm 312 is always subjected to aperture expansion or reduction control to adjust a light receiving amount of the image sensor 14 according to brightness of an environment including an object during the capturing or to express a blurring level of an object image intended by the user.

The vignetting state of the pixels near the center of the image sensor 14 by the diaphragm 312 has been described referring to FIGS. 7A and 7B. However, depending on an aperture state of the diaphragm 312, vignetting is generated not only by the diaphragm 312 but also by a mechanical frame component for holding the lens 311, and the level of vignetting varies from one pixel position to another of the image sensor 14.

Thus, in the focus adjustment apparatus according to the present exemplary embodiment, lens frame information is transmitted from the photographic lens 300 to the camera 100. The camera 100 (e.g., vignetting amount calculation unit included in the AF unit 42) calculates, based on the information, a vignetting correction value corresponding to the pixel position of the image sensor 14.

An output signal from each pixel is corrected by using the vignetting correction value. This correction is well-known as peripheral light amount correction in the imaging apparatus, and thus description thereof is omitted.

As described above, each time focus detection and diaphragm aperture adjustment are simultaneously executed during electronic viewfinder displaying or moving image displaying, a vignetting correction value must be calculated to correct a pixel output. However, in the correction, data is simplified, a calculation amount is reduced, and no manufacturing error is added. As a result, correction errors may occur.

Each time the diaphragm aperture is adjusted, a focus detection result may lose its continuity and be discontinuous. Conventionally, during still image capturing, such a correction error has occurred. However, as it is sufficiently small, the correction error has caused no problem to satisfy quality of the still image.

Figure 8:
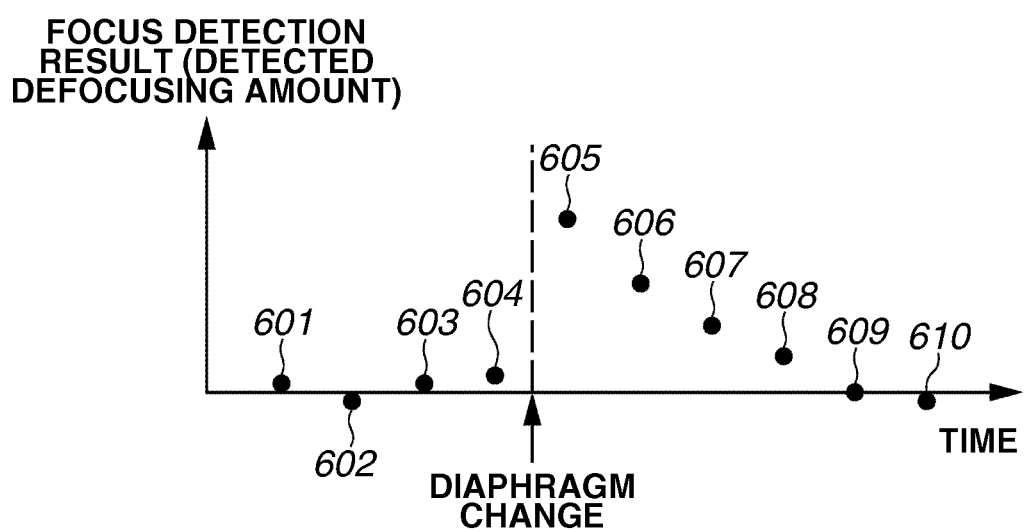
FIG. 8 illustrates an example of a focus detection result before or after diaphragm aperture adjustment.

However, during the electronic viewfinder observation or the moving image capturing, the image is displayed and captured in real time, and hence unnatural motion becomes conspicuous due to the discontinuity of the focus detection result. FIG. 8 illustrates an example of focus detect results before and after diaphragm aperture adjustment, and the discontinuity of the focus detection result is described.

In FIG. 8, a vertical axis indicates a focus detection result. In the case of 0 (on an X axis), the result is not an out-of-focus state but an in-focus state. A horizontal axis indicates time, and results 601 to 610 are results of sequentially executed focus detection operations.

In FIG. 8, the focus detection results 601 to 604 are near 0, maintaining in-focus states. The diaphragm is changed between the focus detection results 604 and 605. The focus detection result 605 indicates a state where the AF unit 42 has determined defocusing. The focus lens included in the lens 31 must accordingly be driven to adjust a focus.

Some reasons are conceivable for the defocusing determination of the AF unit 42 in the focus detection result 605, such as a correction error caused by the diaphragm change and movement of the object. However, reasons cannot be identified. As a result, when the lens is driven based on the focus detection result 605, points discontinuous in an in-focus state may be generated in electronic viewfinder displaying or a recorded moving image.

An error included in the focus detection result is sufficiently small for still image recording. Thus, during the electronic viewfinder displaying or the moving image recording, there is no problem for driving the lens based on the focus detection result. However, during the electronic viewfinder displaying or the moving image recording, images continuous in time are displayed or recorded. As a result, when points discontinuous in an in-focus state are generated, unnaturalness becomes conspicuous.

Thus, according to the present exemplary embodiment, the focus detection result after the adjustment of the diaphragm aperture is corrected in a direction for reducing a lens driving amount calculated therefrom. This can make points discontinuous in an in-focus state generated in the electronic viewfinder displaying or the recorded moving image difficult to be conspicuous, and reduce unnaturalness.

A configuration may be employed where correction is always executed in a direction for reducing the lens driving amount irrespective of a change in diaphragm aperture. With this configuration, however, since the lens is not sufficiently driven even when the object moves, followability to the movement of the object is lost. According to the present exemplary embodiment, by changing processing before and after the aperture change of the diaphragm, reduction of discontinuity in the in-focus state and followability to the movement of the object can both be achieved.

FIG. 8 illustrates, with respect to the focus detection result 605, the focus detection result 606 after driving of the lens by about 40% of the lens driving amount calculated therefrom. The focus detection result 606 indicates a change in an in-focus direction with respect to the focus detection result 605. However, the focus lens must still be driven to adjust a focus.

Similarly, the focus detection results 607 and 608 are results of driving the lens by about 40% of a lens driving amount calculated from a last detected focus detection result, indicating gradual changes in the in-focus direction. In the focus detection result 608, a defocusing amount is smaller.

Hence, the focus detection result 609 is a result after driving of the lens by a lens driving amount calculated therefrom.

The focus detection results 609 and 610 are near 0, maintaining an in-focus state. Thus, correcting the focus detection result after the diaphragm change in the direction for reducing the lens driving amount calculated therefrom enables a gradual change in in-focus state of the electronic viewfinder displaying or the recorded moving image. Thus, unnaturalness during viewing can be reduced.

Figure 9:
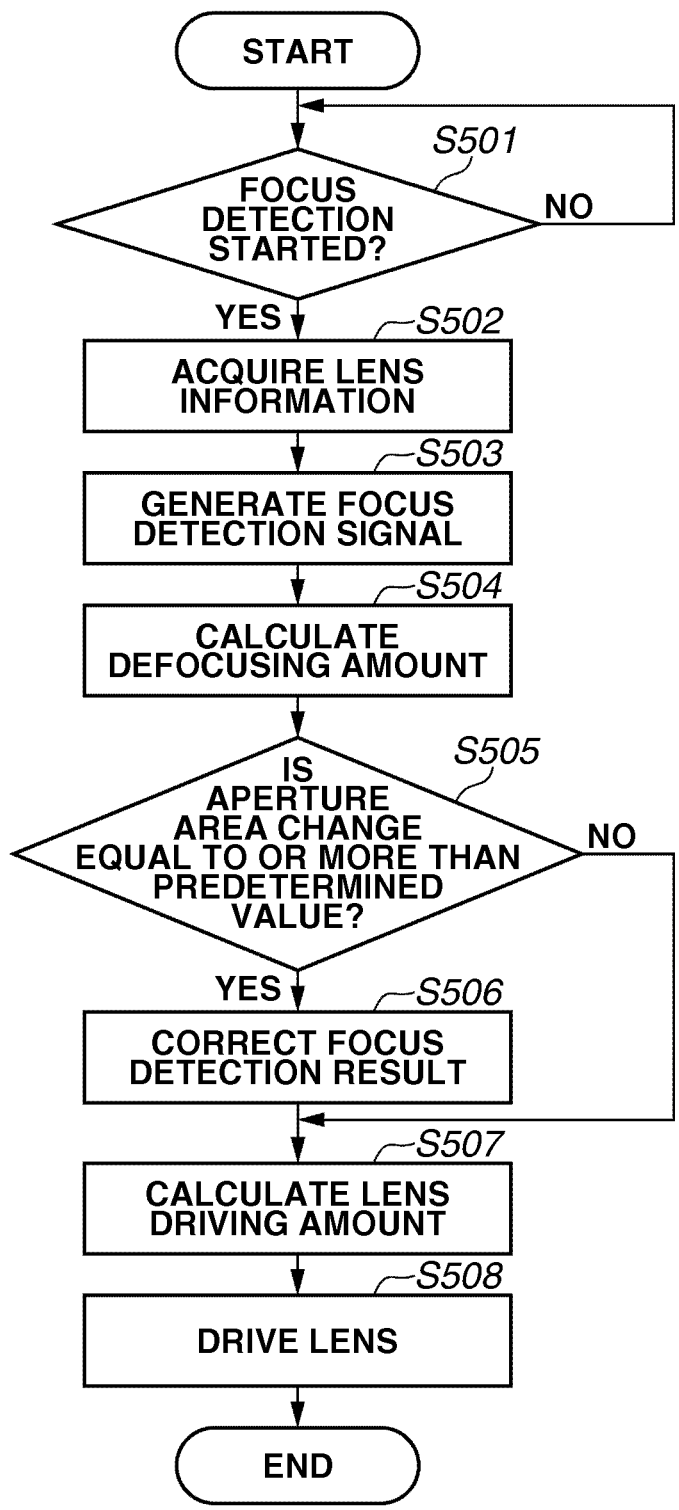
FIG. 9 is a flowchart illustrating a focus adjustment operation according to the first exemplary embodiment.

Next, an operation in the camera 100 is described. FIG. 9 is a flowchart illustrating a focus adjustment operation stored in the system control unit 50. The flowchart illustrates a focus adjustment operation during the electronic viewfinder displaying or the moving image capturing where the main mirror 130 and the sub-mirror 131 are retracted outside an imaging light flux, and the image sensor 104 performs AF of the phase difference detection system. In other words, the focus adjustment operation is performed in parallel with electronic viewfinder displaying or moving image displaying.

First, in step S501, it is determined whether a focus detection start button has been pressed by operating the shutter switch SW 1 or the operation unit 70. When pressed (YES in step S501), the processing proceeds to step S502. In this case, determination is executed based on the focus detection start button. However, focus detection can be started in response to a change to electronic viewfinder displaying or moving image recording.

In step S502, various pieces of lens information such as the lens frame information or the focus lens position of the photographic lens 300 are acquired via the interface units 38 and 338, and the connectors 122 and 322.

In step S503, the synthesizing unit 902 and the coupling unit 903 of the image processing unit 20 generate a pair of focus detection signals from sequentially read image data. The focus detection signals are transmitted to the AF unit 42, and then the processing proceeds to step S504.

The AF unit 42 executes light amount correction or vignetting correction to reduce the influence of vignetting. According to the present exemplary embodiment, the image sensor 14 performs focus detection during the electronic viewfinder displaying or the moving image capturing, and hence the focus detection pixels 901a and 901b are discretely arranged corresponding to thinned reading.

In step S504, the AF unit 42 calculates a shifting amount between the pair of focus detection signals by using a well-known correlation calculation unit, and converts it into a defocusing amount.

In step S505, whether a diaphragm aperture area by the diaphragm aperture adjustment unit has changed by at least a predetermined value from that of last focus detection is determined. The determination is made based on the change in diaphragm aperture area for the purpose of determining whether a change of a vignetting state of the focus detection light flux is large.

When the change of the vignetting state is large, a vignetting error is estimated to be relatively large. When the change of the vignetting state is small, a vignetting error is estimated to be relatively small. Thus, by setting a certain threshold value for determination of a change in diaphragm aperture area, a focus detection result can be corrected only when a vignetting correction error is likely to be large.

Presence of a change in diaphragm aperture area can be determined based on only information at last focus detection. However, the change can be determined based on information at a plurality of previous focus detection operations.

When presence of a change in diaphragm aperture area is determined based on only information at last focus detection, after the change of the diaphragm aperture area, at second focus detection and after, No is selected in step S505, and the focus lens is driven relatively fast. To increase followability to the movement of the object, this configuration is preferred.

When presence of a change in diaphragm aperture area is determined based on information at several focus detection operations, after the change of the diaphragm aperture area, at several focus detection operations, YES is selected in step S505, and the focus lens is driven relatively slow.

When continuity in the in-focus state during the electronic viewfinder displaying or the moving image recording is prioritized, this configuration is preferred. When the diaphragm aperture area has changed by a predetermined value or more, the processing proceeds to step S506. When the diaphragm aperture area has not changed by more than the predetermined value, the processing proceeds to step S507.

In step S506, a focus detection result is corrected. A focus detection result P' after correction is calculated by the following expression (1):

$$P' = K \times P \qquad (1)$$

P: defocusing amount that is a focus correction result before correction

K: coefficient that is a positive number less than 1, corresponding to a correction coefficient in claims Thus, without changing the sign, the focus detection result is corrected so that a value can approach 0.

Lens driving sensitive to a focus detection error caused by the diaphragm aperture change can be reduced, and electronic viewfinder displaying or moving image recording where an in-focus state is discontinuous can be alleviated. For example, to perform driving as described above referring to FIG. 8, the correction is performed by setting K as 0.4.

In step S507, based on the focus detection result calculated in step S504 or the corrected focus detection result calculated in step S506, a lens driving amount of the photographic lens 300 is calculated. In step S508, the lens driving amount is transmitted to the focus control unit 342 of the photographic lens 300 via the interface units 38 and 338 and the connectors 122 and 322, and the focus lens is driven to adjust a focus of the photographic lens 300.

According to the present exemplary embodiment, one threshold value is determined to identify a size of a change in diaphragm aperture area, and one type of correction coefficient is used. However, the number of correction coefficients is not limited to one. By setting a plurality of threshold values for determining a size of a change in diaphragm aperture area and using corresponding correction coefficients, correction corresponding to finer statuses can be performed. The focus adjustment operation of the camera 100 according to the present exemplary embodiment has been described.

As described above, according to the present exemplary embodiment, the processing is performed to correct the focus detection result according to the change in diaphragm aperture area and reduce the lens driving amount calculated based on the focus detection result before the correction. As a result, even during the electronic viewfinder observation or the moving image capturing, natural displaying or recording can be performed with little discontinuity of the in-focus state.

The present exemplary embodiment has been described by taking the example of the AF of the phase difference system executed by the image sensor 19. However, the present exemplary embodiment can be applied to AF of the phase difference system executed by the focus detection device 105.

The present exemplary embodiment has been applied to both of the electronic viewfinder observation and the moving image capturing. However, the present exemplary embodiment can be applied only to the moving image capturing. Specifically, correction by the detection result correction unit is inhibited during the electronic viewfinder observation, while correction by the detection result correction unit is executed during the moving image capturing. Thus, priority can be placed on followability to the movement of the object during the electronic viewfinder observation. Priority can be placed on continuity of the in-focus state during the moving image capturing.

The example of focusing by driving the focus lens of the photographic lens 300 has been described. However, the image sensor 14 can be configured to move back and forth in the optical axis direction of the photographic lens 300, and the focus can be adjusted by driving the image sensor 14.

Particularly, when a photographic lens not good at small-amount driving or low-speed driving is attached to the camera 100, smooth focusing can be performed by driving the image sensor 14. In other words, based on a defocusing amount correction value, the focus can be adjusted by driving at least one of the photographic lens and the image sensor.

A method for calculating a reduced defocusing amount correction value for a defocusing amount during focus detection after a change of a diaphragm aperture area by at least a predetermined value is not limited to the method of multiplication by the fixed correction coefficient.

For example, a correction coefficient proportional to a size of a defocusing amount can be acquired, and the defocusing amount can be multiplied by the correction coefficient. Then, when the defocusing amount is large, a largely reduced defocusing amount correction value can be set. According to the present invention, any method for calculating a defocusing amount correction value can be employed as long as it can reduce a defocusing amount of a focus detection result.

A second exemplary embodiment of the present invention is a modified example of the first exemplary embodiment of the present invention, and directed to a case where a change in an in-focus state varies depending on whether or not a change in diaphragm aperture area is in an enlarging direction. A difference from the first exemplary embodiment is that a correction coefficient of a focus detection result is changed depending on whether the change in diaphragm aperture area is in the enlarging direction.

A configuration of the second exemplary embodiment enables changing of a lens driving amount according to a change in depth of field, and achievement of both reduction in discontinuity of the in-focus state and followability to movement of an object.

FIG. 1, which is a block diagram illustrating the configuration of the imaging apparatus, FIG. 2 to FIGS. 6A and 6B, which illustrate the focus detection execution method, FIG. 7, which illustrates the change in focus detection light flux at the time of the diaphragm aperture area change, and FIG. 8, which illustrates the focus detection method before and after the diaphragm aperture area change according to the first exemplary embodiment can be applied to the second exemplary embodiment.

Figure 10:
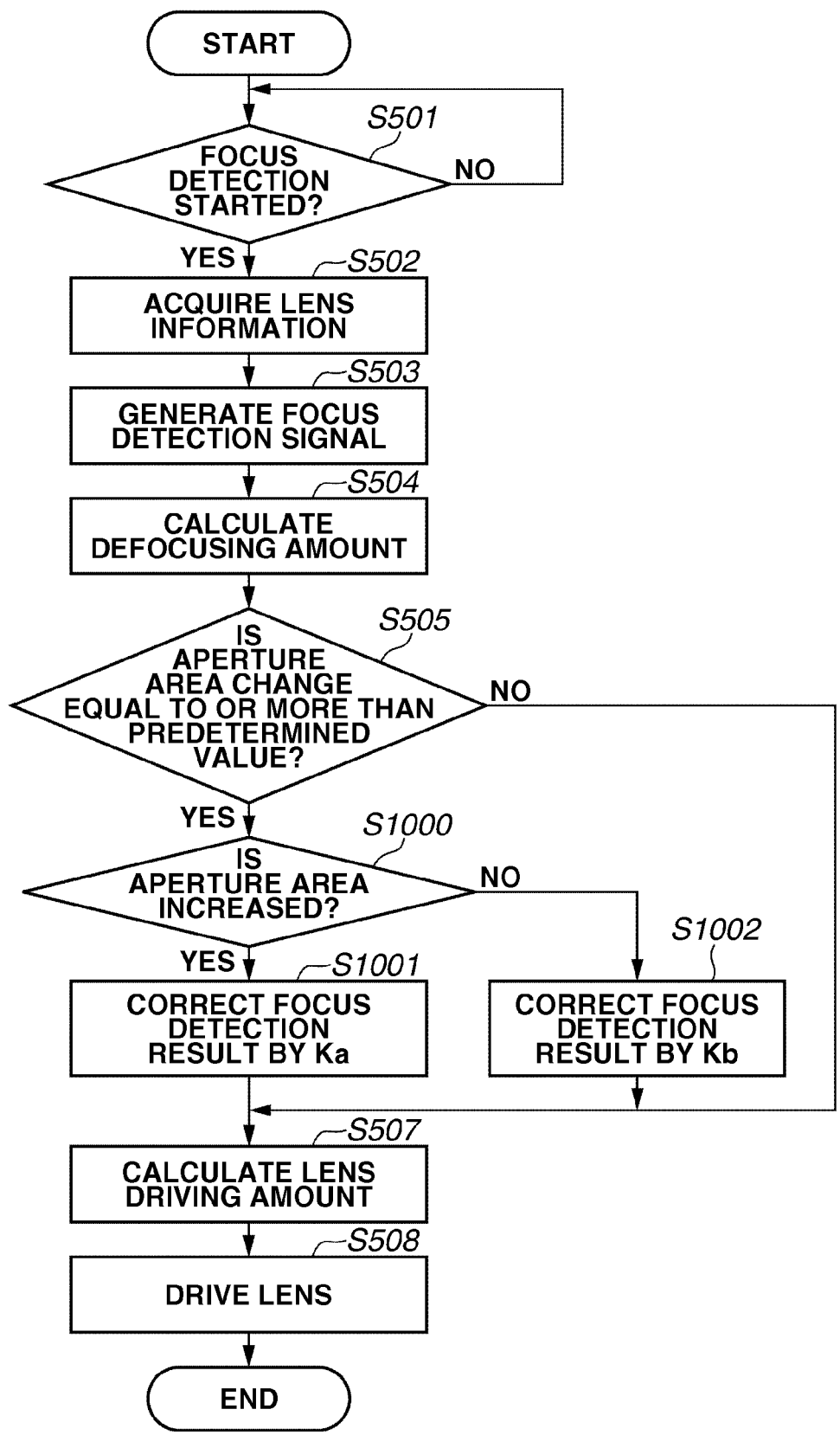
FIG. 10 is a flowchart illustrating a focus adjustment operation according to a second exemplary embodiment.

Referring to FIG. 10, an operation in a camera 100 according to the second exemplary embodiment is described. FIG. 10 is a flowchart illustrating a focus adjustment operation stored in a system control unit 50.

In the flowchart, the focus adjustment operation is performed in parallel with electronic viewfinder displaying or moving image recording. In steps having suffixes the same as those of the first exemplary embodiment illustrated in FIG. 9, similar processing is executed, and thus description thereof is omitted.

Step S1000 is executed when it is determined that a diaphragm aperture area has changed by at least a predetermined value (YES in step S505). Whether the diaphragm aperture area has increased is determined therein.

Generally, when the diaphragm aperture area increases, a depth of field is reduced to cause a change in in-focus state to be conspicuous. When the diaphragm aperture area decreases, in contrast thereto, the change in in-focus state is not conspicuous. Thus, according to the present exemplary embodiment, a correction level of a focus detection result is changed according to enlargement or reduction of the diaphragm aperture area.

In step S1001, a focus detection result is corrected. A focus detection result P' after correction is calculated by the following expression (2):

$$P' = Ka \times P \quad (2)$$

Ka: coefficient that is a positive number less than 1
Thus, without changing the sign, the focus detection result is corrected so that a value can approach 0. Ka corresponds to a first correction coefficient in claims.

In step S1002, a focus detection result is corrected. A focus detection result P' after correction is calculated by the following expression (3):

$$P' = Kb \times P \quad (3)$$

Kb: coefficient that is a positive number less than 1
Thus, without changing the sign, the focus detection result is corrected so that a value can approach 0. Kb corresponds to a second correction coefficient in claims A relationship between Ka and Kb is described. In step S1001, the diaphragm aperture area increases to cause the change in in-focus state to be conspicuous. Hence, sudden lens driving easily generates discontinuous points in the in-focus state during the electronic viewfinder displaying or the moving image recording. In step S1002, the reverse occurs because of the reduced diaphragm aperture area.

According to the second exemplary embodiment, therefore, Ka is set to a value smaller (value near 0) than that of Kb. Thus, when the change in in-focus state after the diaphragm aperture area change is conspicuous, a lens can be driven more slowly. When the change in in-focus state after the diaphragm aperture area change is not conspicuous, priority is placed on followability to movement of the object, and the lens can be driven faster. The focus adjustment operation of the camera 100 according to the second exemplary embodiment of the present invention has been described.

As described above, according to the present exemplary embodiment, based on the enlarged or reduced diaphragm aperture area, the coefficient for correcting the focus detection result is changed, and the focus detection result is corrected in a manner of driving the lens more slowly when the change in the in-focus state is conspicuous. As a result, even during the electronic viewfinder observation or the moving image capturing, natural displaying or recording can be performed with little discontinuity of the in-focus state.

According to the second exemplary embodiment, the correction coefficient for the focus detection result is selected based on only the enlargement or the reduction of the diaphragm aperture area. However, the correction coefficient can be selected by using other information.

For example, the depth of field changes depending on the lens focal distance. Thus, the correction coefficient for the focus detection result can be selected in view of the focal distance among the pieces of lens information acquired in step S502. As a result, a correction value corresponding to the change in depth of field can be selected more accurately.

A third exemplary embodiment of the present invention is a modified example of the first exemplary embodiment of the present invention, and directed to a case where a change in an in-focus state varies depending on a detected defocusing amount. A difference from the first exemplary embodiment is that a correction coefficient of a focus detection result is changed depending on the detected defocusing amount.

A configuration of the third exemplary embodiment enables changing of a lens driving amount according to the detected defocusing amount, and achievement of both reduction in discontinuity of the in-focus state and followability to movement of an object. FIG. 1, which is a block diagram illustrating the configuration of the imaging apparatus according to the first exemplary embodiment can be applied to the third exemplary embodiment.

Figure 11:
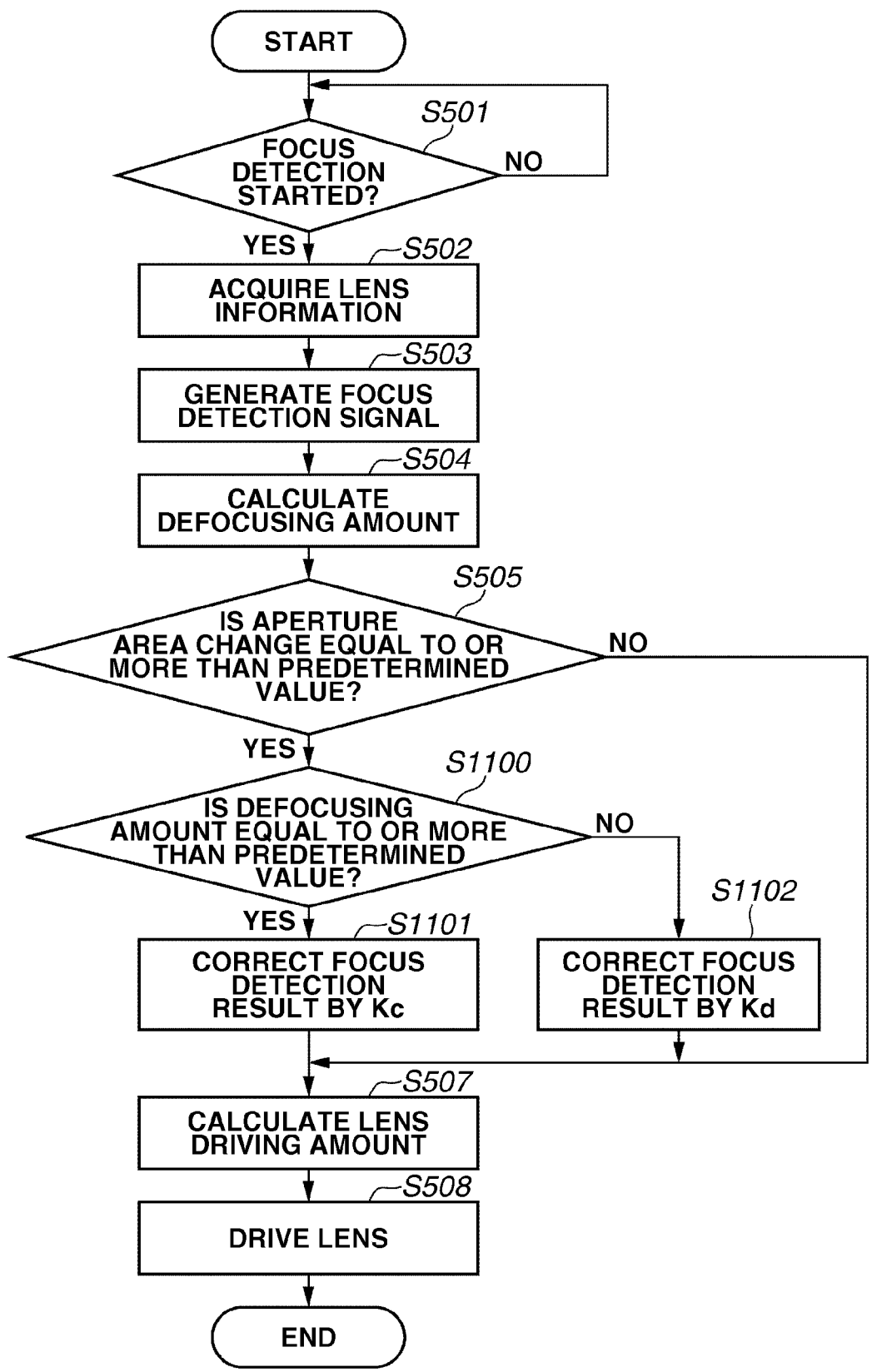
FIG. 11 is a flowchart illustrating a focus adjustment operation according to a third exemplary embodiment.

Referring to FIG. 11, an operation in a camera 100 according to the third exemplary embodiment is described. FIG. 11 is a flowchart illustrating a focus adjustment operation stored in a system control unit 50.

In the flowchart, the focus adjustment operation is performed in parallel with electronic viewfinder displaying or moving image recording. In steps having suffixes to the same as those of the first exemplary embodiment illustrated in FIG. 9, similar processing is executed, and thus description thereof is omitted.

Step S1100 is executed when it is determined that a diaphragm aperture area has changed by at least a predetermined value (YES in step S505). Whether the defocusing amount calculated in step S504 is larger than a predetermined value is determined.

Generally, when the calculated defocusing amount is large, a necessary lens driving amount is also large. When the lens is driven in this state, a change in in-focus state becomes conspicuous. Thus, according to the present exemplary embodiment, a correction level of a focus detection result is changed according to the detected defocusing amount.

In step S1101, a focus detection result is corrected. A focus detection result P' after correction is calculated by the following expression (4):

$$P'=Kc \times P \quad (4)$$

Kc: coefficient that is a positive number less than 1
Thus, without changing the sign, the focus detection result is corrected so that a value can approach 0. Kc corresponds to a third correction coefficient in claims.

In step S1102, a focus detection result is corrected. A focus detection result P' after correction is calculated by the following expression (5):

$$P'=Kd \times P \quad (5)$$

Kd: coefficient that is a positive number less than 1
Thus, without changing the sign, the focus detection result is corrected so that a value can approach 0. Kd corresponds to a fourth correction coefficient in claims A relationship between Kc and Kd is described. In step S1101, when the defocusing amount detected in step S504 is equal to or more than a predetermined value (YES instep S1100), and the lens is driven without any correction, a lens driving amount becomes relatively large. When the lens driving amount is large, because of the conspicuous change in in-focus state, sudden lens driving easily generates discontinuous points in the in-focus state during the electronic viewfinder displaying or moving image recording.

In step S1002, when the defocusing amount detected in step S504 is smaller than the predetermined value (NO in step S1100), and the lens is even driven without any correction, a lens driving amount is relatively small. According to the third exemplary embodiment, therefore, Kd is set to a value smaller (value near 0) than that of Kc. Thus, when the change in in-focus state after the diaphragm aperture area change is conspicuous, in other words, when the detected defocusing amount is large, the lens is driven more slowly.

When the change in in-focus state is not conspicuous, in other words, when the detected defocusing amount is small, priority is placed on followability to movement of the object, and the lens is driven faster. The focus adjustment operation of the camera 100 according to the third exemplary embodiment of the present invention has been described above.

As described above, according to the present exemplary embodiment, based on the size of the detected defocusing amount, the coefficient for correcting the focus detection result is changed, and the focus detection result is corrected in a manner of driving the lens more slowly when the change in the in-focus state is conspicuous.

As a result, even during the electronic viewfinder observation or the moving image capturing, natural displaying or recording can be performed with little discontinuity of the in-focus state. According to the third exemplary embodiment, one threshold value is determined to identify the size of the defocusing amount, and two types of correction coefficients are used. However, the number of correction coefficients is not limited to two.

By setting a plurality of threshold values for determining a size of a defocusing amount and using corresponding correction coefficients, correction corresponding to finer statuses can be performed.

A fourth exemplary embodiment of the present invention is a modified example of the first exemplary embodiment of the present invention, and directed to a case where a size of an error generated during vignetting correction varies because of a difference in vignetting state between a pair of focus detection light fluxes. A difference from the first exemplary embodiment is that a correction coefficient of a focus detection result is changed based on a ratio of vignetting states between the pair of focus detection light fluxes.

A configuration of the fourth exemplary embodiment enables changing of a lens driving amount according to a size of an expected vignetting correction error, and achievement of both reduction in discontinuity of the in-focus state and followability to movement of an object. FIG. 1, which is a block diagram illustrating the configuration of the imaging apparatus according to the first exemplary embodiment applies to the fourth exemplary embodiment.

Figure 12:
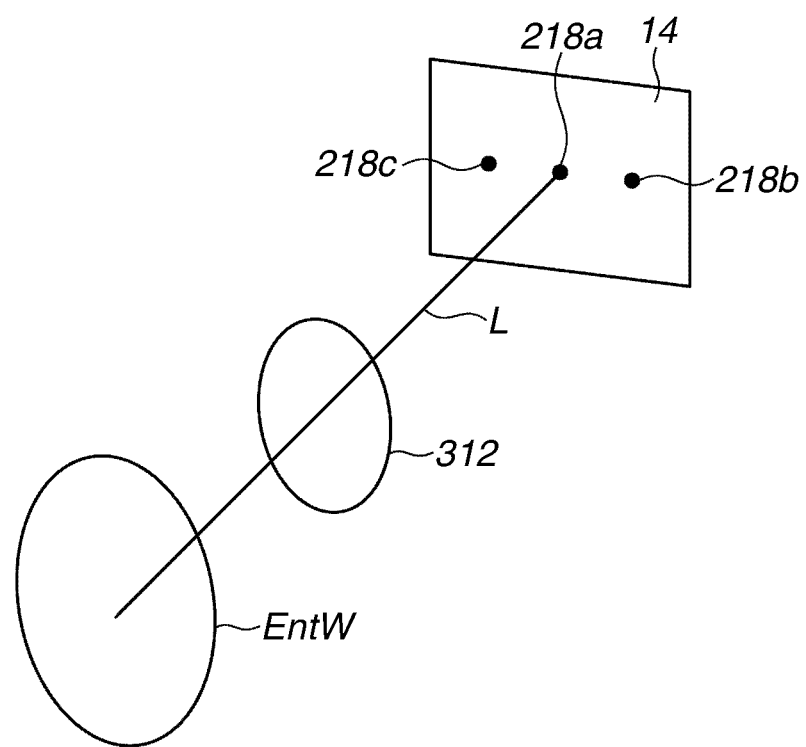
FIG. 12 illustrates a relationship between a lens frame and a diaphragm.

Referring to FIGS. 12 and 1, a vignetting status of a focus detection light flux is described. FIG. 12 illustrates a lens frame for determining a vignetting status in a certain state of a photographic lens 300.

One lens frame EntW generates vignetting in the focus detection light flux. The lens frame EntW generates vignetting according to pixel positions on an image sensor 14 in association with a diaphragm 312, which is an exit pupil. The photographic lens 300 has an optical axis L. FIG. 12 illustrates points of intersection 218a, 218b, and 218c between the cross focus detection areas illustrated in FIG. 6B. The point of intersection 218a is between the focus detection areas 218av and 218ah, and similarly the points of intersection 218b and 218c are between the respective focus detection areas.

The lens frame EntW and the diaphragm 312 are different in distance from the image sensor 14 and aperture diameter, and a light flux reaching the image sensor 14 must pass through these two openings. Thus, a light flux reaching a pixel portion other than near the point of intersection 218a of the image sensor 14 is affected by not only the diaphragm 312 but also the lens frame EntW.

Figure 13A:
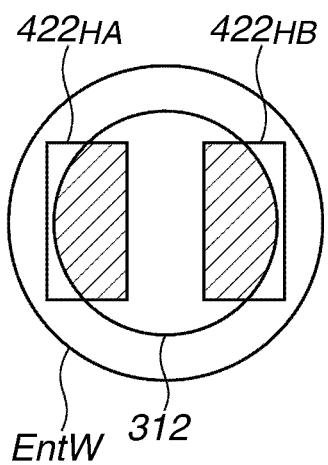
FIGS. 13A and 13B illustrate the lens frame and the diaphragm seen from the image sensor side.
Figure 13B:
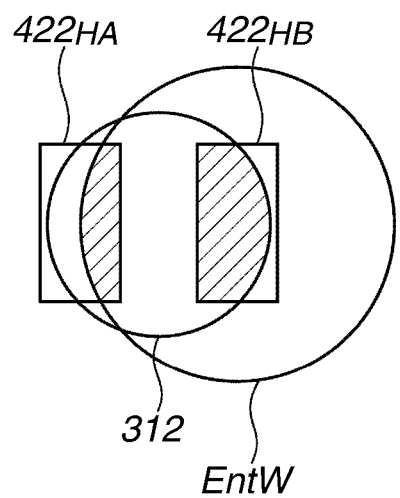

FIGS. 13A and 13B schematically illustrate a difference in vignetting status of a focus detection light flux between positions on the image sensor 14. FIG. 13A illustrates pixels near the point of intersection 218a of the image sensor 14, and FIG. 13B illustrates pixels near the point of intersection 218b of the image sensor 14. Both illustrate focus detection pixels to divide a pupil in a longitudinal direction of the image sensor 14.

FIG. 13A illustrates two lens frames EntW and 312 that affect vignetting as in the case illustrated in FIG. 12, and exit pupil areas $422_{HA}$ and $422_{HB}$ similar to those illustrated in FIGS. 4A and 4B, through which a pair of focus detection light fluxes pass. The light fluxes passed through the focus detection areas reach pixels $S_{HA}$ and $S_{HB}$.

However, the exit pupil areas are partially blocked by the diaphragm 312 to generate vignetting, and only light fluxes passed through diagonal-line portions illustrated in FIG. 13A reach the pixel. In this case, light amounts of the pair of focus detection light fluxes are nearly equal to each other as indicated by areas of the shaded areas.

In FIG. 13B, how light fluxes are blocked by a diaphragm 312 and a lens frame EntW are different between focus detection areas $422_{HA}$ and $422_{HB}$. Similarly, in FIG. 13B, light fluxes passed through the shaded areas reach the image sensor 14 without vignetting.

In the focus detection area $422_{HA}$, focus detection light flux vignetting occurs due to the lens frame EntW. In the focus detection area $422_{HB}$, focus detection light flux vignetting occurs due to the diaphragm 312. In this case, as indicated by areas of the shaded areas, light amounts of the pair of focus detection light fluxes are smaller in the area $422_{HA}$ than in the area $422_{HB}$.

As described above, when vignetting occurs, based on lens frame information transmuted from the photographic lens 300 to the camera 100, a vignetting correction value corresponding to a pixel position of the image sensor 14 is calculated, and an output signal from each pixel is corrected.

The shaded area in the focus detection area $422_{HA}$ illustrated in FIG. 13B is smaller in area than that in the focus detection area $422_{HA}$ illustrated in FIG. 13A. Generally, therefore, more vignetting occurs to reduce a light amount in a pixel not near the center of the image sensor 14 that in a pixel near the center of the image sensor 14.

Thus, to correct light amounts, in the pixel not near the center, as compared with the pixel near the center of the image sensor 14, its output must be more greatly amplified in value to be corrected.

When pixel outputs contain errors due to shapes of the diaphragm 312 and other lens frames that generate vignetting or manufacturing errors in assembling, when the value is amplified more largely and corrected, the errors contained in the pixel outputs are also amplified. This generates a difference between the pair of acquired focus detection signals. As described above, in AF of a phase difference detection system, focus detection is performed by comparing the pair of focus detection signals acquired from the pair of focus detection light fluxes with each other.

Thus, when a degree of matching in shape is low between the pair of focus detection signals, a focus detection error is generated. In other words, the pair of pixels not near the center of the image sensor 14 where nonuniform vignetting occurs as illustrated in FIG. 13B more easily contains errors in focus detection result than that near the center of the image sensor 14 where uniform vignetting occurs as illustrated in FIG. 13A.

According to the present exemplary embodiment, therefore, the focus detection result is corrected in view of a difference in vignetting status between the pair of focus detection light fluxes. The lens frame information corresponds to lens information in claims.

Figure 14:
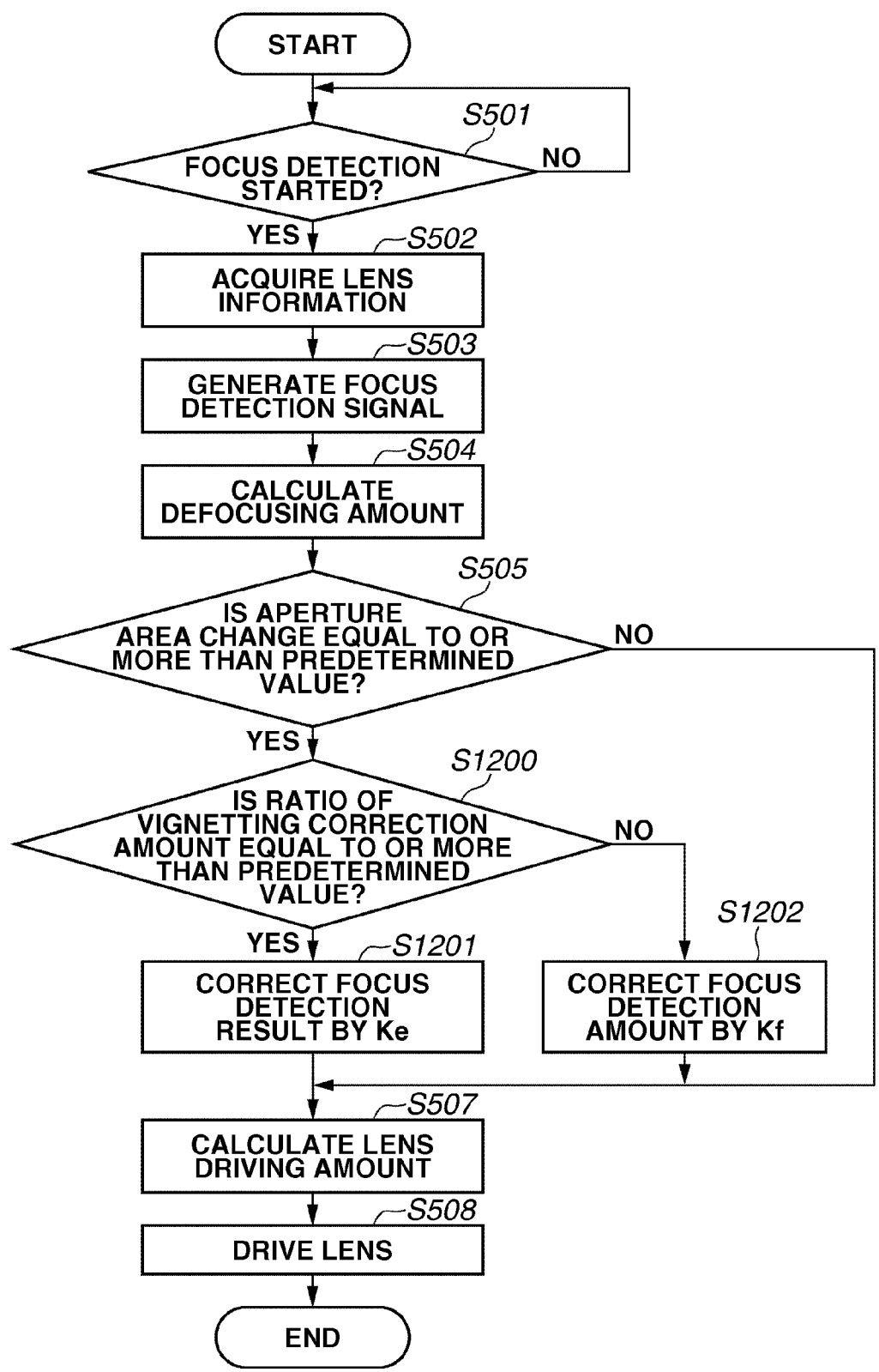
FIG. 14 is a flowchart illustrating a focus adjustment operation according to a fourth exemplary embodiment.

Referring to FIG. 14, an operation in the camera 100 according to the fourth exemplary embodiment is described. FIG. 14 is a flowchart illustrating a focus adjustment operation stored in a system control unit 50.

In the flowchart, the focus adjustment operation is performed in parallel with electronic viewfinder displaying or moving image recording. In steps having suffixes to the same as those of the first exemplary embodiment illustrated in FIG. 9, similar processing is executed, and thus description thereof is omitted.

Step S1200 is executed when it is determined that a change in diaphragm aperture area is equal to or more than a predetermined value (YES in step S505). In this case, whether a ratio of a pair of light amount correction values calculated in step S503 to correct vignetting (i.e., a ratio of vignetting amounts of a pair of light fluxes calculated by a vignetting amount calculation unit (value acquired by dividing a large vignetting amount by a small vignetting amount) is determined.

An output of each pixel is multiplied to execute correction by the light amount correction values of the pair of focus detection light fluxes. Thus, the ratio of the pair of light amount correction values indicates a difference in vignetting status between the pair of focus detection light fluxes.

As described above, when the difference in vignetting status between the pair of focus detection light fluxes is large, the acquired focus detection result easily contains errors. Thus, according to the present exemplary embodiment, a correction level of a focus detection result is changed according to the difference in vignetting status between the focus detection light fluxes.

In step S1201, a focus detection result is corrected. A focus detection result P' after correction is calculated by the following expression (6):

$$P'=Ke \times P \quad (6)$$

Ke: coefficient that is a positive number less than 1
Thus, without changing any code, the focus detection result is corrected so that a value can approach 0. Ke corresponds to a fifth correction coefficient in claims.

In step S1202, a focus detection result is corrected. A focus detection result P' after correction is calculated by the following expression (7):

$$P'=Kf \times P \quad (7)$$

Kf: coefficient that is a positive number less than 1
Thus, without changing any code, the focus detection result is corrected so that a value can approach 0. Kf corresponds to a sixth correction coefficient in claims.

A relationship between Ke and Kf is described. In step S1201, the difference in vignetting status between the focus detection light fluxes is large, creating a possibility that the focus detection result may contain errors. Thus, when a lens is driven based on a lens driving amount calculated from the acquired focus detection result, discontinuous points are easily generated in the in-focus state during the electronic viewfinder displaying or the moving image recording.

In step S1202, the difference in vignetting status between the focus detection light fluxes is small with a low possibility that the focus detection result may contain errors, hence a status is reverse. According to the fourth exemplary embodiment, therefore, Ke is set to a value smaller (value near 0) than that of Kf.

When the focus detection result easily contains errors, the lens is driven more slowly. When the focus detection result does not easily contain any errors, priority is placed on followability to movement of the object, and the lens can be driven faster. The focus adjustment operation of the camera 100 according to the fourth exemplary embodiment of the present invention has been described.

As described above, according to the present exemplary embodiment, based on the difference in vignetting status between the focus detection light fluxes, the coefficient for correcting the focus detection result is changed, and the focus detection result is corrected in a manner of driving the lens more slowly when the focus detection result easily contains errors. As a result, even during the electronic viewfinder observation or the moving image capturing, natural displaying or recording can be performed with little discontinuity of the in-focus state.

According to the fourth exemplary embodiment, one threshold value is determined to determine the ratio of the vignetting correction amounts, and two types of correction coefficients are used. However, the number of correction coefficients is not limited to two. By setting a plurality of threshold values for determining a ratio of vignetting correction amounts and using corresponding correction coefficients, correction corresponding to finer statuses can be performed.

According to the fourth exemplary embodiment, the focus detection result is always corrected when the diaphragm aperture area change is equal to or more than the predetermined value. However, this is not necessary. Even when the diaphragm aperture area change is equal to or more than the predetermined value, if a ratio of vignetting correction values is near 1, correction may not be necessary because errors contained in the focus detection result are small. Thus, focusing can be performed at a higher speed following movement of the object.

The exemplary embodiments of the present invention have been described above. However, the embodiments are in no way limitative of the present exemplary embodiments. Various changes and modifications can be made within the gist of the invention.

while the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-205293 filed Sep. 14, 2010, which is hereby incorporated by reference herein in its entirety.

What is claimed is:

1. A focus adjustment apparatus comprising:
a first adjustment unit configured to execute control to adjust a diaphragm aperture area of a lens unit;
a detection unit configured to detect a defocusing amount;
a second adjustment unit configured to execute control to adjust a focus based on the defocusing amount; and
a controller configured to control, when the diaphragm aperture area has been changed larger than a predetermined amount, the second adjustment unit to reduce a changing of focus based on the defocusing amount,
wherein the controller is configured to multiply the defocusing amount by a correction coefficient that is a positive number less than 1,
wherein the controller has a first correction coefficient, and a second correction coefficient larger in value than the first correction coefficient, and
wherein the first correction coefficient is used during focus detection after the first adjustment unit has changed the diaphragm aperture area to be larger, and the second correction coefficient is used during focus detection after the first adjustment unit has changed the diaphragm aperture area to be smaller.

2. The focus adjustment apparatus according to claim 1, wherein the focus adjustment based on the defocusing amount is performed by driving the lens unit or an image sensor configured to convert an optical image formed by a light flux passed through the lens unit into an electric signal.

3. The focus adjustment apparatus according to claim 1, wherein the first correction coefficient is used during focus detection after the first adjustment unit has changed the diaphragm aperture area to be larger by a value equal to or larger than a predetermined value, and the second correction coefficient is used during focus detection after the first adjustment unit has changed the diaphragm aperture area to be smaller by a value equal to or more than the predetermined value.

4. The focus adjustment apparatus according to claim 1, wherein the controller has a third correction coefficient, and a fourth correction coefficient larger than the third correction coefficient,
wherein the third correction coefficient is used when the defocusing amount detected by the detection unit is equal to or larger than a predetermined value, and the fourth correction coefficient is used when the defocusing amount is less than the predetermined value.

5. The focus adjustment apparatus according to claim 1, wherein the controller determines the correction coefficient based on lens information of the lens unit.

6. The focus adjustment apparatus according to claim 5, further comprising a calculation unit configured to calculate vignetting amounts of a pair of light fluxes passed through the lens unit,
wherein the controller has a fifth correction coefficient, and a sixth correction coefficient larger than the fifth correction coefficient,
wherein the fifth correction coefficient is used when a ratio of the vignetting amounts of the pair of light fluxes calculated by the calculation unit is equal to or larger than a predetermined value, and the sixth correction coefficient is used when the ratio of the vignetting amounts of the pair of light fluxes calculated by the calculation unit is less than the predetermined value.

7. The focus adjustment apparatus according to claim 1, further comprising an image sensor configured to convert an optical image formed by a light flux passed through the lens unit into an electric signal,
wherein the image sensor includes the detection unit.

8. The focus adjustment apparatus according to claim 1, wherein correction by the controller is inhibited during electronic viewfinder observation, and correction by the controller is executed during moving image capturing.

9. The focus adjustment apparatus according to claim 1, wherein the detection unit is configured to detect a defocusing amount by using a pair of light fluxes passed through different areas of the lens unit.

* * * * *